United States Patent
Kimmel

(10) Patent No.: US 9,817,017 B2
(45) Date of Patent: Nov. 14, 2017

(54) METHOD AND APPARATUS FOR MONITORING INDIVIDUALS WHILE PROTECTING THEIR PRIVACY

(71) Applicant: Zebadiah M. Kimmel, Cambridge, MA (US)

(72) Inventor: Zebadiah M. Kimmel, Cambridge, MA (US)

(73) Assignee: Atlas5D, Inc., Cambridge, MA (US)

( * ) Notice: Subject to any disclaimer, the term of this patent is extended or adjusted under 35 U.S.C. 154(b) by 560 days.

(21) Appl. No.: 14/352,303

(22) PCT Filed: Oct. 12, 2012

(86) PCT No.: PCT/US2012/060041
§ 371 (c)(1),
(2) Date: Jul. 28, 2014

(87) PCT Pub. No.: WO2013/066601
PCT Pub. Date: May 10, 2013

(65) Prior Publication Data
US 2014/0299775 A1    Oct. 9, 2014

Related U.S. Application Data

(63) Continuation of application No. PCT/US2012/058443, filed on Oct. 2, 2012, and a
(Continued)

(51) Int. Cl.
*G01P 13/00* (2006.01)
*G06K 9/00* (2006.01)
(Continued)

(52) U.S. Cl.
CPC ............. *G01P 13/00* (2013.01); *G01S 17/50* (2013.01); *G06K 9/00771* (2013.01); *G08B 13/19686* (2013.01)

(58) Field of Classification Search
CPC ........................................... G06T 2207/10028
See application file for complete search history.

(56) References Cited

U.S. PATENT DOCUMENTS

| 4,406,544 A | 9/1983 | Takada et al. |
| 4,650,330 A | 3/1987 | Fujita |

(Continued)

FOREIGN PATENT DOCUMENTS

| WO | WO-01/01354 A1 | 1/2001 |
| WO | WO-2013/058985 A1 | 4/2013 |
| WO | WO-2014/112632 A1 | 7/2014 |

OTHER PUBLICATIONS

Loker et al., "Size-specific Analysis of Body Scan Data to Improve Apparel Fit," Journal of Textile and Apparel, Technology and Management, 4(3): 4-6 (2005).
(Continued)

*Primary Examiner* — Steven Lim
*Assistant Examiner* — Kam Ma
(74) *Attorney, Agent, or Firm* — Choate, Hall & Stewart LLP; William R. Haulbrook

(57) ABSTRACT

A system for monitoring individuals while protecting their privacy includes at least one energy emitter configured to emit energy onto a field-of-view that may contain an individual, and at least one energy sensor configured to capture reflected energy from within the field-of-view. A spatial measurement module calculates spatial measurements of objects within the field-of-view based on data from the energy sensor. A schematic generation module creates schematic views of objects within the field-of-view, distinguishing human beings from each other and from inanimate objects or animals. Three-dimensional measurements of the individual and environs are transformed into a two-dimensional or other schematic view, allowing ongoing monitoring of the individual while preventing viewing of the indi-
(Continued)

vidual's face and appearance, and preventing observation of what the individual may be wearing or watching.

21 Claims, 17 Drawing Sheets

Related U.S. Application Data continuation of application No. PCT/US2012/058534, filed on Oct. 3, 2012.

(60) Provisional application No. 61/548,079, filed on Oct. 17, 2011, provisional application No. 61/561,627, filed on Nov. 18, 2011, provisional application No. 61/567,940, filed on Dec. 7, 2011, provisional application No. 61/663,889, filed on Jun. 25, 2012.

(51) Int. Cl.
*G01S 17/50* (2006.01)
*G08B 13/196* (2006.01)

(56) References Cited

U.S. PATENT DOCUMENTS

| | | | |
|---|---|---|---|
| 5,530,652 A | 6/1996 | Croyle et al. | |
| 5,742,521 A * | 4/1998 | Ellenby | G01C 17/34 702/127 |
| 6,111,755 A | 8/2000 | Park | |
| 7,440,590 B1 * | 10/2008 | Hassebrook | G01B 11/2513 345/582 |
| 7,551,432 B1 | 6/2009 | Bockheim et al. | |
| 7,684,185 B2 | 3/2010 | Farrugia | |
| 8,269,834 B2 | 9/2012 | Albertson et al. | |
| 8,613,666 B2 | 12/2013 | Esaki et al. | |
| 8,639,020 B1 * | 1/2014 | Kutliroff | G06T 7/0071 345/420 |
| 8,775,710 B1 | 7/2014 | Miller et al. | |
| 8,787,663 B2 * | 7/2014 | Litvak | G06K 9/00375 382/165 |
| 8,902,607 B1 | 12/2014 | Chang et al. | |
| 9,037,354 B2 | 5/2015 | Mondragon et al. | |
| 9,189,886 B2 | 11/2015 | Black et al. | |
| 9,341,464 B2 | 5/2016 | Kimmel | |
| 9,361,696 B2 * | 6/2016 | Allezard | G06T 7/0046 |
| 9,393,695 B2 * | 7/2016 | Scott | B25J 9/1694 |
| 9,513,667 B2 | 12/2016 | Pais et al. | |
| 9,520,072 B2 | 12/2016 | Sun et al. | |
| 9,524,554 B2 | 12/2016 | Plagge et al. | |
| 2003/0076414 A1 * | 4/2003 | Sato | G01S 11/12 348/148 |
| 2003/0209893 A1 | 11/2003 | Breed et al. | |
| 2003/0231788 A1 * | 12/2003 | Yukhin | G06K 9/00201 382/115 |
| 2004/0083142 A1 | 4/2004 | Kozzinn | |
| 2004/0104905 A1 | 6/2004 | Chung et al. | |
| 2004/0236456 A1 | 11/2004 | Pieper et al. | |
| 2005/0094879 A1 | 5/2005 | Harville | |
| 2005/0162824 A1 | 7/2005 | Thompson | |
| 2006/0252541 A1 | 11/2006 | Zalewski et al. | |
| 2007/0229850 A1 | 10/2007 | Herber | |
| 2007/0252831 A1 | 11/2007 | Lind et al. | |
| 2008/0103637 A1 | 5/2008 | Bliven et al. | |
| 2009/0244309 A1 * | 10/2009 | Maison | G06K 9/00369 348/222.1 |
| 2010/0007717 A1 | 1/2010 | Spektor et al. | |
| 2010/0049095 A1 | 2/2010 | Bunn et al. | |
| 2010/0172567 A1 * | 7/2010 | Prokoski | A61B 5/0064 382/132 |
| 2010/0191541 A1 | 7/2010 | Prokoski | |
| 2010/0226533 A1 * | 9/2010 | Bharath | G06K 9/00268 382/103 |
| 2011/0052006 A1 * | 3/2011 | Gurman | G06K 9/00201 382/103 |
| 2011/0081044 A1 * | 4/2011 | Peeper | G06T 7/0081 382/103 |
| 2011/0193939 A1 * | 8/2011 | Vassigh | G06F 3/011 348/46 |
| 2011/0205337 A1 * | 8/2011 | Ganapathi | G06K 9/00342 348/46 |
| 2011/0206273 A1 * | 8/2011 | Plagemann | G06K 9/00342 382/154 |
| 2011/0211044 A1 | 9/2011 | Shpunt et al. | |
| 2011/0211754 A1 | 9/2011 | Litvak et al. | |
| 2011/0288964 A1 * | 11/2011 | Linder | B25J 9/1689 705/27.1 |
| 2011/0298801 A1 * | 12/2011 | Wexler | G06T 15/205 345/422 |
| 2012/0046101 A1 | 2/2012 | Marks et al. | |
| 2012/0076361 A1 * | 3/2012 | Fujiyoshi | G06T 7/004 382/103 |
| 2012/0120580 A1 | 5/2012 | Yukawa et al. | |
| 2012/0128327 A1 * | 5/2012 | Matsubara | H04N 9/8227 386/244 |
| 2012/0159290 A1 * | 6/2012 | Pulsipher | G06K 9/00369 714/819 |
| 2012/0162483 A1 * | 6/2012 | Sutton | H01L 27/14605 348/240.2 |
| 2012/0229634 A1 | 9/2012 | Laett et al. | |
| 2012/0242501 A1 | 9/2012 | Tran et al. | |
| 2012/0257814 A1 * | 10/2012 | Kohli | G06T 5/005 382/154 |
| 2012/0269384 A1 * | 10/2012 | Jones | G06K 9/00201 382/103 |
| 2012/0326959 A1 * | 12/2012 | Murthi | G06K 9/209 345/156 |
| 2013/0048722 A1 | 2/2013 | Davis et al. | |
| 2013/0109253 A1 | 5/2013 | Gammon et al. | |
| 2013/0163170 A1 | 6/2013 | Chen | |
| 2013/0163879 A1 * | 6/2013 | Katz | G06T 7/0044 382/195 |
| 2013/0315475 A1 | 11/2013 | Song et al. | |
| 2013/0335235 A1 | 12/2013 | Carr et al. | |
| 2014/0163330 A1 | 6/2014 | Horseman | |
| 2014/0243686 A1 * | 8/2014 | Kimmel | A61B 5/1118 600/476 |
| 2014/0279740 A1 | 9/2014 | Wernevi et al. | |
| 2014/0298379 A1 | 10/2014 | Singh | |
| 2014/0299775 A1 * | 10/2014 | Kimmel | G06K 9/00771 250/341.8 |
| 2014/0300907 A1 * | 10/2014 | Kimmel | G01B 11/00 356/625 |
| 2014/0376172 A1 | 12/2014 | Love et al. | |
| 2015/0000025 A1 | 1/2015 | Clements | |
| 2015/0213702 A1 | 7/2015 | Kimmel | |
| 2015/0325004 A1 | 11/2015 | Utsunomiya et al. | |
| 2015/0331463 A1 | 11/2015 | Obie et al. | |
| 2016/0231778 A1 | 8/2016 | Kaneko | |
| 2016/0247017 A1 | 8/2016 | Sareen et al. | |
| 2016/0266607 A1 | 9/2016 | Varsanik et al. | |
| 2016/0267652 A1 | 9/2016 | Kimmel et al. | |
| 2016/0331277 A1 | 11/2016 | Kimmel | |

OTHER PUBLICATIONS

Viktor et al., "Measuring to Fit: Virtual Tailoring through Cluster Analysis and Classification," NRC Publications Archive, entire document (2006).
International Search Report for PCT/US12/60041 mailed Dec. 27, 2012 (2 pages).
Written Opinion for PCT/US12/60041 mailed Dec. 27, 2012 (12 pages).
Ergotron Dock Locker, dated Feb. 2, 2015, <http://www.hpi.com/ergotron-dock-locker-secure-table-stand.html> retrieved from google on Jan. 6, 2017
Stone. E.E. and Skubic, M., Evaluation of an Inexpensive Depth Camera for Passive In-Home Fall Risk Assessment, 2011 5th

(56) References Cited

OTHER PUBLICATIONS

International Conference on Pervasive Computing Technologies for Healthcare (PervasiveHealth) and Workshops, pp. 71-77 (2011).

* cited by examiner

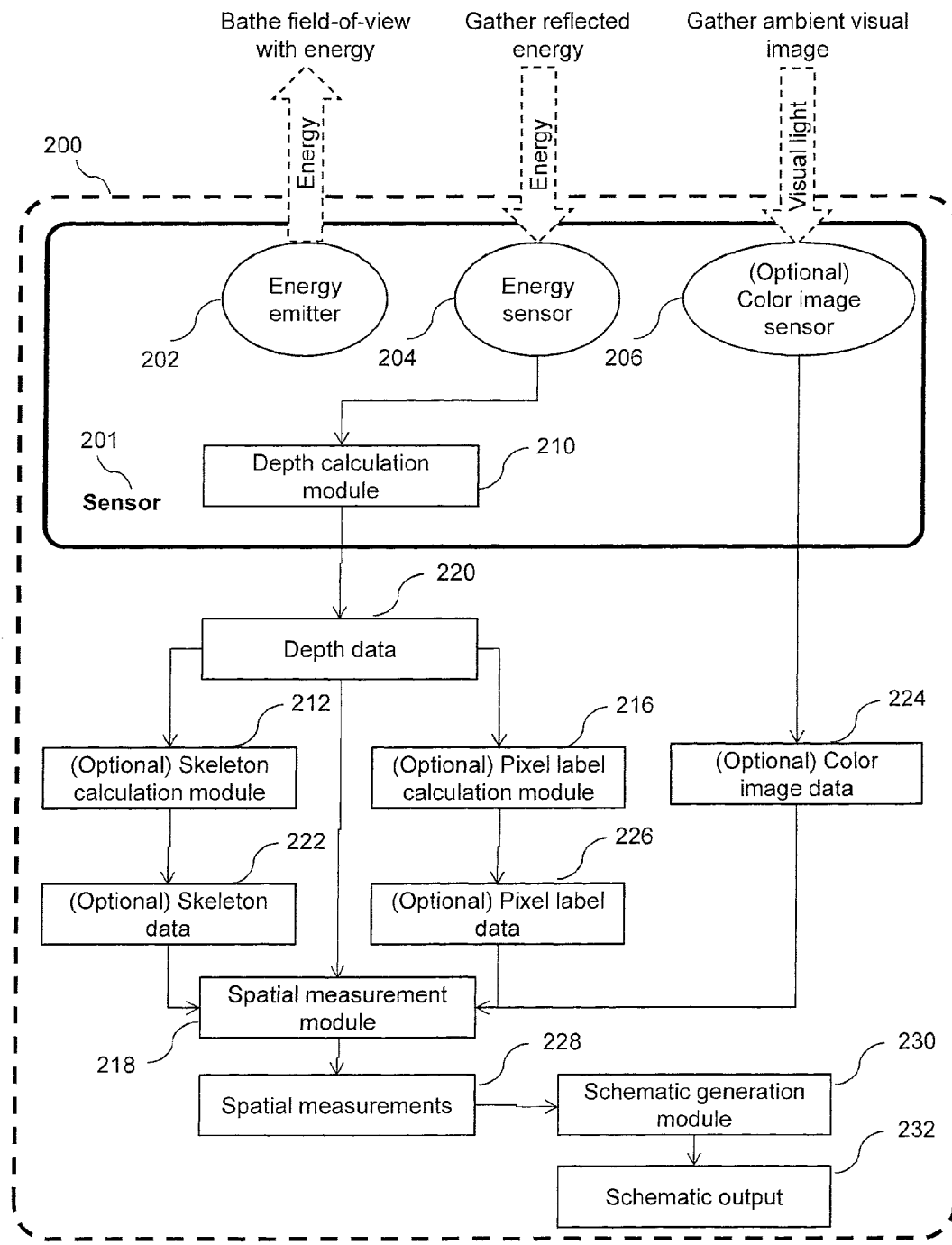

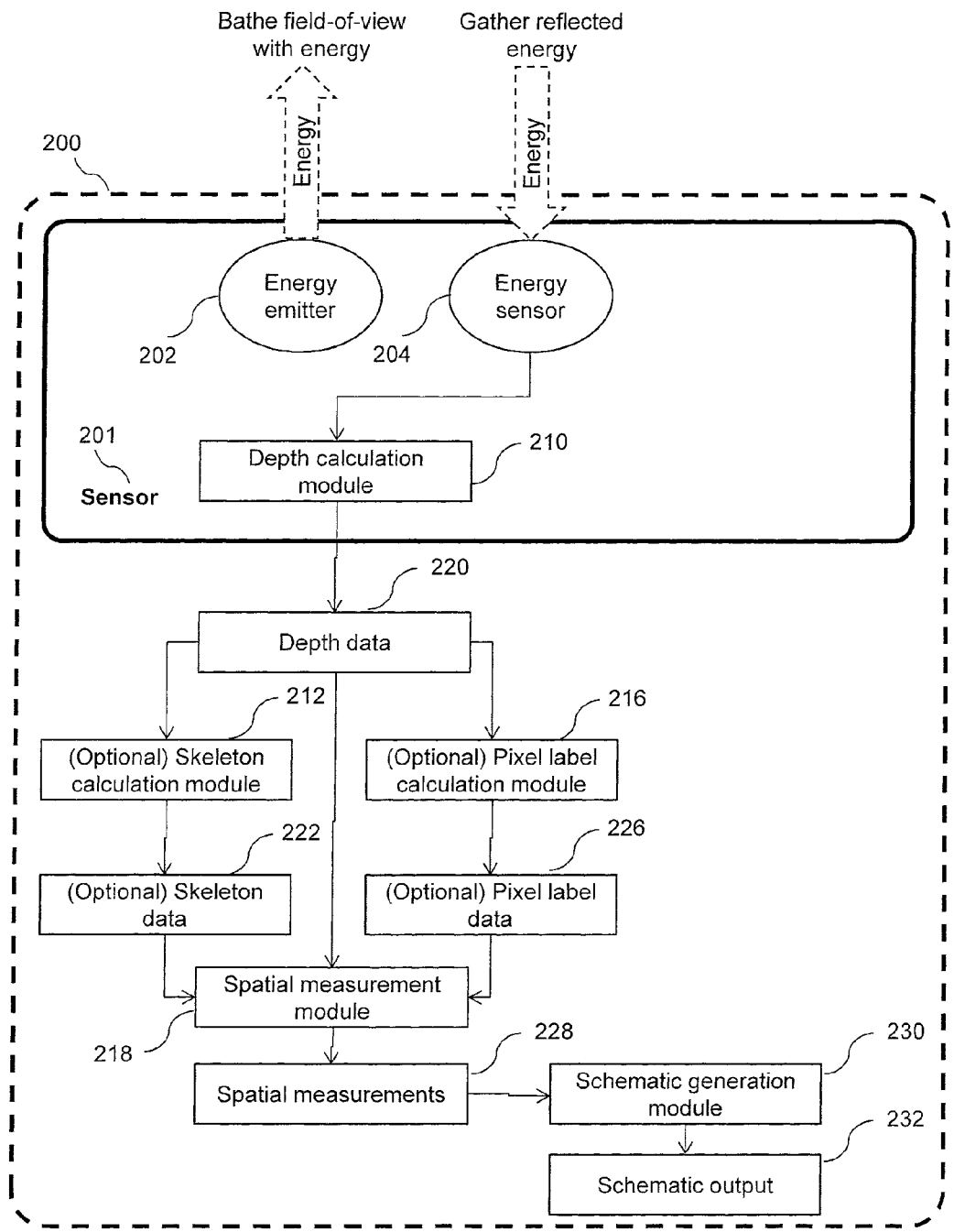

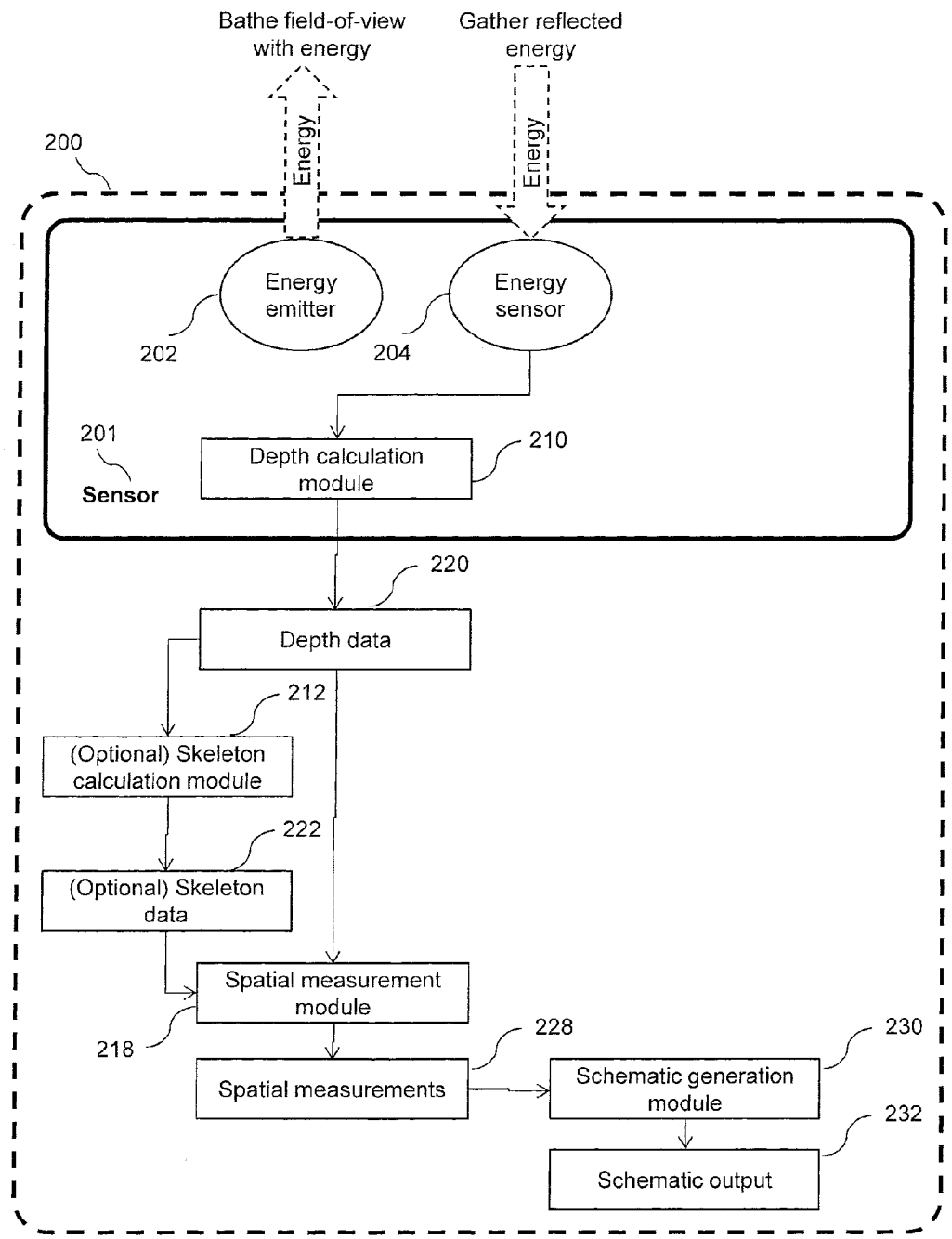

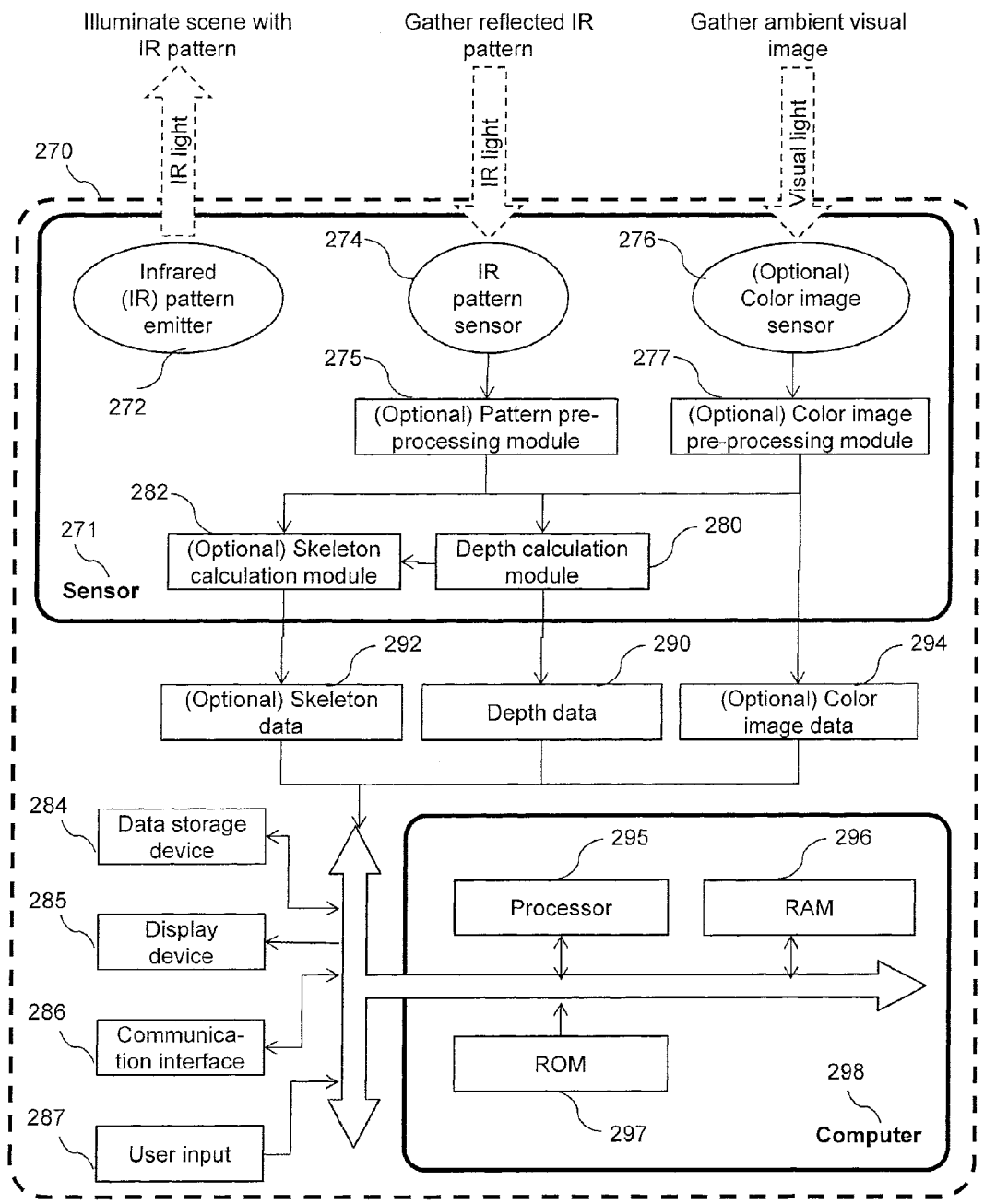

though optionally an infrared illuminator may be used
in order to facilitate such operation in the dark;

METHOD AND APPARATUS FOR MONITORING INDIVIDUALS WHILE PROTECTING THEIR PRIVACY

PRIORITY CLAIM

This application claims the benefit of Provisional Patent Application Ser. No. 61/548,079, filed on Oct. 17, 2011, Provisional Patent Application Ser. No. 61/561,627, filed on Nov. 18, 2011, Provisional Patent Application Ser. No. 61/567,940, filed on Dec. 7, 2011, Provisional Patent Application Ser. No. 61/663,889, filed on Jun. 25, 2012, PCT International Application Serial No. PCT/US12/58443 filed on Oct. 2, 2012, and PCT International Application Serial No. PCT/US12/58534 filed on Oct. 3, 2012. All of the above-identified provisional patent applications and PCT international applications are incorporated by reference herein in their entirety.

BACKGROUND OF THE INVENTION

This invention relates to monitoring of an individual's presence and movement. "Presence" as used herein refers to an individual's location, especially with reference to a particular room of a building (e.g., the presence of a person within a specific location in a kitchen or a living room, such as standing in a corner or seated at a table). "Movement" as used herein refers to an individual's movement, especially with reference to leg, arm, or head movement (e.g., the movement of a person as the person walks from one point in a room to another, or the shifting of a person's body or head posture while otherwise standing or sitting still).

Monitoring an individual's presence and movement is useful in a wide variety of applications. Security cameras are commonplace in government and business facilities, and use thereof is increasing in private residences. GPS (global positioning satellite) sensors worn by individuals suffering from dementia detect "wandering" behavior in those individuals and alert caregivers. Baby monitors with video cameras allow parents to keep a vigilant eye on their children.

Monitoring for presence and movement comes with an important trade-off: the more precise and convenient the monitoring, the more invasive it is of an individuals' privacy. Security cameras—which are both precise and convenient—record a person's appearance and visage, and using modern facial recognition algorithms, can even reveal a person's identity. Such cameras, which are precise and convenient, are highly invasive of privacy. On the other hand, worn GPS sensors are less invasive, but are less precise and less convenient.

Because of this trade-off, any type of monitoring that requires precision and convenience, coupled with privacy, cannot currently be readily satisfied. An important example is the monitoring of older individuals in their own home. Specifically, it is desirable to monitor the presence and movement of an older individual who lives alone, in order to reassure friends and family that the individual is doing well, is able to move around, is not sick, has not fallen into a hypoglycemic coma, has not fallen down, etc.

However, older individuals actively (and appropriately) are opposed to placing video cameras or similar devices into their homes that will show what they are wearing, what they look like, what they are reading, what they are watching on TV, etc. There is an important unmet need to monitor older individuals in their own homes while respecting and protecting their privacy.

Known methods of monitoring presence and movement suffer from one or more of the following disadvantages:

Known methods may generate visual data that show a person's face or body, or show what the person is wearing, or show what the person is reading or watching, thereby invading privacy;

Known methods may be susceptible to "reverse engineering" whereby visual images of the individual may be reconstructed from underlying data, even if the known methods attempt to obfuscate or to hide such images;

Known methods may require that specific devices, such as GPS devices, be physically worn by an individual;

Known methods may be imprecise and/or inconvenient;

Known methods may be unable to distinguish between multiple persons at the same time, or between persons and animals.

Known methods may require a lighted environment to work, and thus fail to work in the dark.

SUMMARY

To overcome the above-described problems, some embodiments of the present invention do not rely on video or image data streams. Instead, some embodiments of the inventive system and method rely on ongoing acquisition of "data-snapshots," which are each obtained from a single viewpoint, as described below, wherein each data-snapshot contains at least depth data, and preferably a combination of depth and/or skeleton data and/or pixel label data.

Such data-snapshots may optionally be supplemented by one or more audio streams in order to observe a person's voice, and/or one or more video streams in order to observe a person's appearance—either over time, or at specific times (e.g., during an emergency). Measurements of an individual's activity, gait, and posture—as well as a variety of other body measurements—may also be obtained and analyzed from one or more such data-snapshots, as also described in detail in the related applications to which this application claims priority.

Embodiments of the present inventive system and method include the following advantages, which are not intended as exhaustive list:

In some embodiments, it may utilize only one energy emitter and only one camera, in order to obtain depth data, and/or skeleton data, and/or pixel label data;

In some embodiments, the data used to monitor the individual is of a nature such that the appearance of the individual cannot be reconstructed from the data, thus ensuring that any visual information about the individual—including, e.g., face, state of dress, apparel being worn, what the individual is reading, what the individual is watching—cannot be discovered or "reverse-engineered" by others;

In some embodiments, it may utilize two cameras of non-overlapping frequencies, in order to obtain at least depth data, and preferably image data, skeleton data, and/or pixel label data as well;

In some embodiments, it may be sized such that the overall hardware components easily fit onto a shelf or at the base of a television at home;

In some embodiments, it may monitor (and distinguish between) multiple users in the same field-of-view at the same time;

It does not require any individuals being observed to wear any sensors or devices or special clothing;

In some embodiments, it may operate in the dark (without the need for exogenous light);

In some embodiments, it may operate on an ongoing basis, for example, around-the-clock;

In some embodiments, it may not require the use of visual-light camera or video, thus protecting the user's privacy so that, for example, it is not possible to view the user's face or what the viewer is wearing;

In some embodiments, it acquires detailed, high-resolution data that are highly relevant to tracking presence and movement of individuals, without revealing their face or appearance, or without determining the activities in which they are engaged;

In some embodiments, it allows an optional visual or audio data stream to be established, e.g., during emergencies;

It does not require a separate human operator (other than the individual who is being monitored);

It is low-cost, compact, portable, and affordable;

It is easy to install and operate in an individual's own home;

It does not require special training or skills to operate;

It is able to supply health status measurements to third parties, such as relatives, caregivers, or clinicians, in order to enable reassurance and/or early warning and/or intervention;

It has low computational requirements, allowing it to execute efficiently on low-end, affordable machinery;

It permits the user to move about while health status measurements are being acquired, without having to pose or stay still;

It is passive rather than active, and so does not require the user to have to remember to perform particular actions or to engage in particular activities;

It enables real-time interactivity with the user, for example, it may adjust or respond in real-time to the user's movements, or communicate useful information (such as health status measurements displayed on a screen) to the user in real-time.

There are many useful applications of this low-cost, convenient method and apparatus of monitoring presence and movement while protecting privacy. The following recitation of useful applications is not intended to be an exhaustive list, but merely points out the wide and divergent fields in which embodiments of the present inventive method find application.

Elderly individuals living alone at home are particularly vulnerable to subtle health status deterioration that escapes detection until too late. Such deterioration may be due to infection (e.g. pneumonia), malnutrition, depression, a recent surgery or hospital discharge, or myriad other causes, and may initially appear minor: e.g., a somewhat more-shuffling gait, a bit more time spent in bed each day, a softer volume of speech. But if not attended to, such deterioration may progress, steadily worsening until it reaches a "tipping point," after which the individual can no longer compensate, declines rapidly, and ends up hospitalized, permanently institutionalized, or both.

Some embodiments of the present inventive method and apparatus allow a small, affordable sensor to be placed within the individual's home that allows friends, family, or other caregivers to monitor the individual's presence and movement on a real-time basis, and to become aware if the individual's presence or movement deviates from baseline or from typical daily routines, all the while ensuring that the individual's face, and appearance cannot be viewed.

Such a "silent guardian" offers benefits to caregivers and providers, in addition to the individuals being guarded. Currently, caregivers may endure round-the-clock concern and worry about their loved ones, such as elderly parents; embodiments of the present inventive method offer reassurance that caregivers will receive advance warning in many situations that previously would have "slipped through the cracks." Furthermore, providers, insurers, and the healthcare system overall, may benefit from the lower costs stemming from prevented hospitalizations.

Embodiments of the present inventive method and apparatus may also be used to enhance care of a patient after discharge from a hospital (for example, after a hip or knee surgery). For example, the present inventive method and apparatus may be used by clinicians to ascertain the frequency, intensity, and quality of ambulation of post-surgical patients, while preserving the patient's privacy.

Embodiments of the present inventive method and apparatus may also be placed in care settings where patients are treated more intensively but are still ambulatory, such as hospital wards, assisted-living facilities, or nursing homes. In these cases, such embodiments can provide early warning to on-site providers or care managers, thus reducing the need for round-the-clock human monitoring. The ability of the present inventive method and apparatus to simultaneously monitor, and distinguish between, multiple individuals is especially important in multi-dweller or institutional settings.

The above examples show that embodiments of the present inventive method and apparatus are useful in many applications across home and ambulatory care, as well as in other applications such as security.

Specifically, one embodiment of the present inventive method includes:

a) Identifying and acquiring a collection of three-dimensional depth measurements b) Identify the presence and position of an individual and/or other objects within the collection of three-dimensional depth measurements c) (Optionally) Transforming the depth measurements from a three-dimensional collection of data into a two-dimensional collection d) Marking which elements of the three-dimensional and/or two-dimensional collection correspond to the individual and/or other objects being monitored e) Transmitting the three-dimensional and/or two-dimensional collection and/or marks to an operator and/or another user and/or a storage system f) (Optionally) Analyzing and/or reporting on the collection and marks, including, e.g., text messages or emails g) Repeating starting from step a) until all desired measurements have been obtained

BRIEF DESCRIPTION OF THE DRAWINGS

FIGS. 2A-2F show block diagrams according to specific embodiments of the present system and method.

DETAILED DESCRIPTION

Figure 1A:
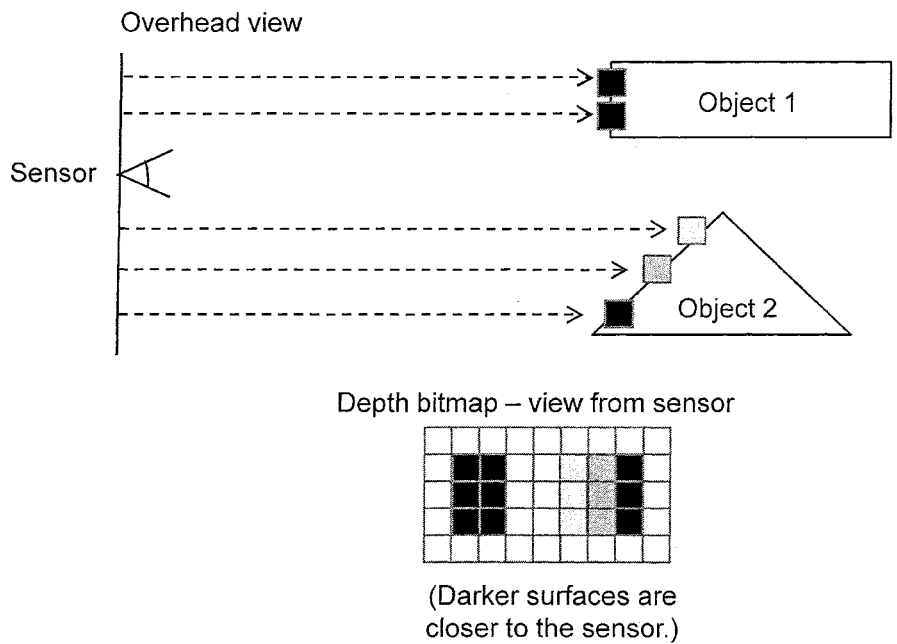
FIGS. 1A and 1B show representations of depth data.

Embodiments of the present invention are designed to enable presence and movement monitoring of one or more individuals while protecting the privacy of those individuals. The system may utilize a single energy sensor to obtain, at a minimum, depth data; or two energy sensors of non-overlapping frequencies to obtain a combination of depth data and spectral data (for example, color image data). Skeleton data (which consists of the approximate locations in space of joints, or of other ambiguous and/or diffuse anatomic structures) may in turn be calculated from the acquired depth and/or spectral data. Pixel label data (which consists of labeling pixels in acquired depth maps or color image maps, such that the labeled pixels correspond to the body surfaces of humans in the field-of-view) may also be calculated from the acquired depth and/or spectral data.

Any collection of distance measurements to (or between) objects in a field-of-view is referred to herein as "depth data". There are many ways to acquire, calculate, or otherwise generate depth data for a field-of-view.

For example, depth data may be calculated based on a "time-of-flight" method. In this method, light with known physical characteristics (such as wavelength) is emitted into a field-of-view. An energy sensor, such as a camera, receives the light that is reflected from the field-of-view. Changes in the physical characteristics of the light between its being emitted and its being received—for example, the round-trip transit time of a light pulse, or the phase shift of an emitted waveform—allow calculation of the distance to various objects (that reflect the light) in the field-of-view.

If light pulses are utilized (for example, to measure round-trip transit time), the emitter can be, for example, a pulsed LED. If continuous light is utilized (for example, to measure phase shift), the emitter can be, for example, a laser. Time-of-flight cameras are a subset of LIDAR (Light Detection and Ranging) technologies, in which emitted-and-reflected light is used to remotely gauge the distance or other properties of a target. LIDAR cameras are similar to radar devices; the main difference is that radar bounces radio waves off target objects, but LIDAR uses ultraviolet, visible, or near-infrared light. Mesa Imaging AG, of Zurich, Switzerland, is an example of a company that manufactures devices suitable to acquire depth data through time-of-flight: for example, its SR4000 time-of-flight camera.

Besides LIDAR, a different method of calculating depth data is through the use of "pattern deformation methods," also sometimes called "light coding". In pattern deformation methods, a light pattern with known physical characteristics (such as pattern shape and spacing) is emitted into a field-of-view. An energy sensor, such as a camera, receives the light pattern that is reflected from the field-of-view. Changes in the pattern between its being emitted and its being received—for example, gridlines moving closer further apart, or average distances between speckled dots growing or shrinking—allow calculation of the distance to various objects (that reflect the light) in the field-of-view.

In contrast to time-of-flight or LIDAR, the specific wavelengths or transit times of the emitted light are not crucial; what matters in pattern-deformation methods are the emitted pattern in which the light is placed, and how that emitted pattern is subsequently reflected and deformed by objects in the field-of-view. Because the specific wavelength is less important in pattern-deformation methods, a common choice of wavelength in such methods is infrared, which light cannot be seen by the human eye, and can be superimposed on a scene without disturbing people. If the light pattern is relatively fixed and constant, it is called "structured light"—often, structured-light patterns are grids of regular lines.

If the light pattern exhibits random or pseudorandom variation, it is called "coded light"—often, coded-light patterns are lattices of dots. The reason why random or pseudorandom variations may be used in light patterns is so that small areas of the pattern will "look slightly different" compared to each other, enabling easier lining-up and registration of the emitted and reflected patterns. PrimeSense Limited, of Tel Aviv, Israel, is an example of a company that manufactures depth sensors suitable to acquire depth data through pattern deformation. Its sensors are embedded in, for example, the Microsoft Kinect device (Microsoft Corp., Seattle, USA) and the Asus Xtion device (Asustek Computer Inc., Taipei, Taiwan).

Besides time-of-flight, LIDAR, and pattern deformation, a different method of acquiring depth data is through the use of emitted energy that is not light. For example, sound (rather than light) may be emitted and bounced off objects; the reflected physical characteristics of the sound, such as round-trip transit time, or frequency or phase shift, may be used to calculate depth or other characteristics of the objects in the field-of-view. Sommer Mess-Systemtechnik, of Koblach, Austria is an example of a company that manufactures devices suitable to acquire depth data through ultrasonic impulses: for example, its USH-8 sensor, which uses ultrasonic impulses to measure snow depth.

Embodiments of the present invention may use any type of emitted and received energy, including but not limited to visible light, ultraviolet light, infrared light, radio waves, audible sound waves, ultrasonic frequencies, and pressure vibrations, in order to acquire depth data. Embodiments of the present invention are agnostic as to the source of depth data. As used herein, "depth data" refers to measurements of the distances to objects (or portions of objects) in a field-of-view.

Note that the term "camera" is used herein for convenience only, and any energy sensor, or image capture device, or energy capture device, or data capture device using various ranges of electromagnetic radiation or other types of energy may be used and substituted therefore. The terms "energy sensor", "camera," "image capture device," "energy capture device," and "data capture device" are used interchangeably herein.

Some such devices need not emit electromagnetic radiation, because they capture energy based on reflected radiation already present in the environment. Other such devices may emit electromagnetic radiation and capture reflected radiation, such as ultrasonic transducers, and the like, where such emitted electromagnetic or other energy radiation is not present in the environment to a sufficient degree or sufficiently present in known directions relative to a target.

Additionally, the number of energy sensors are not limited to one or two such devices: one energy sensor, two energy sensors, or more than two energy sensors may be used (for example, to generate additional stereoscopic data, or to cover a larger region of space), as well as a single energy sensor.

"Image data" or "image" as used herein may refer to data or image captured by any of the above-mentioned devices or sensors, such as an energy sensor, a camera, an image capture device, an energy capture device, and/or a data capture device, and need not necessarily refer to the optical range. In one embodiment, image data may refer to the same visual-spectrum data that would be generated by a standard digital camera, consisting of a 2D photographic pixel map, where each pixel represents a visible color.

Note that in general, the term "color" as used herein may refer to all the colors of the visual spectrum, or a grayscale spectrum, or any other palette of visual colors that are perceptible by the human eye. As used herein, "color image data" refers to visual (visible to the human eye) image data, similar to that captured by a standard consumer digital camera.

Figure 1B:
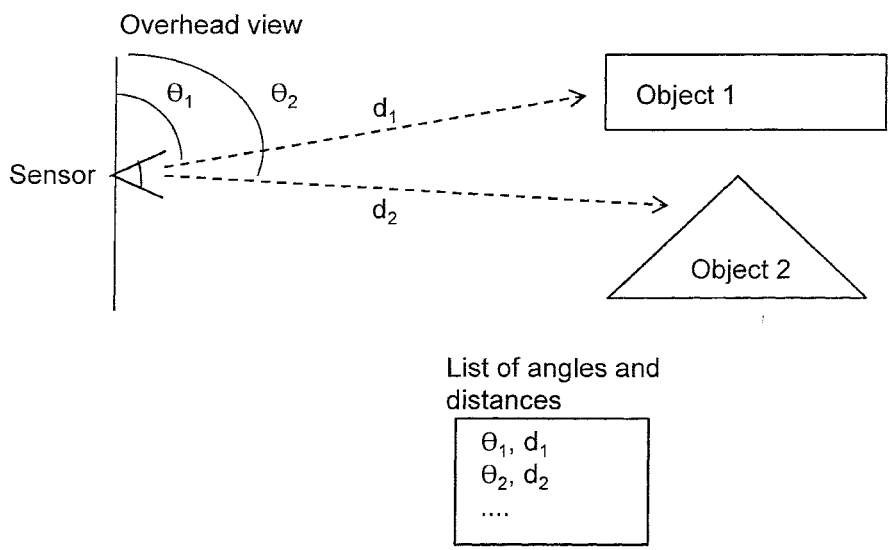

"Depth data" is less intuitive than color image data. Depth data represents the distance from a sensor to a nearest object in space. FIGS. 1A and 1B show two representations of depth data. The preferred representation of depth data, shown in FIG. 1A, is a 2D bitmap, also sometimes referred to as a depth map. However, alternate representations are also possible. The value of each (x, y) pixel in the 2D bitmap shown in FIG. 1A represents the distance from a common reference plane—typically a vertical plane established by the sensor itself, with the x-axis running horizontally, and the y-axis running vertically—to the closest physical object, along a normal ray projected outward from the common reference plane at that (x, y) coordinate. In such a coordinate system, since the y-axis extends floor-to-ceiling, and the x-axis extends to left-and-right of the sensor, it follows that the z-axis extends straight out from the sensor into the field-of-view.

A 2D depth data bitmap therefore corresponds to a quantized contour, or topographic, map of the sensor's field-of-view. Equivalently, a pixel value z at position (x, y) in the data bitmap indicates that the surface (or edge) of a real-world object exists at coordinate position (x, y, z) in physical space.

A depth bitmap can represent depth data only for aspects of an object that are visible to the sensor: any aspects of an object that are out-of-view of the viewpoint are "invisible" and not represented in the depth bitmap.

For example, if we were to obtain a depth data bitmap of the Moon as taken from standing on the Earth, we would find that a collection of pixels in the middle of the bitmap formed the shape of a circle. The pixels in the center would have the lowest distance values (they would correspond to the central part of the Moon which is closest to the Earth), and the pixels at the edge of the circle would have the highest distance values (they would correspond to the edge of the visible face of the Moon). Pixels outside the circle of the Moon, representing the void of space, would have maximum distance values (essentially equivalent to infinity). The "dark side of the Moon", invisible to us, would not be represented in the bitmap at all.

FIG. 1B shows an alternate representation of depth data, in which the positions of objects in the field-of-view are described using a list of angles and distances. Such a representation is not as advantageous as the bitmap approach, due to the complexity of "working backwards" to identify which objects are placed where in space.

FIG. 2A shows a block diagram of an embodiment of the present method and system. A system for monitoring individuals while protecting their privacy (the system) is shown generally as 200, which may be used to carry out the method disclosed in this document. As set forth above, any form of active energy capture (emission of energy and capture of the reflected energy) or passive energy capture (capture of reflected energy based on ambient energy sources) may be used.

As shown in FIG. 2A, energy emitter 202 bathes the field-of-view with energy. As described previously, the energy emitted may include visible light, or non-visible light, or sound, or any other type of energy. The energy emitted may bathe the entire field-of-view all at once, or may bathe different parts of the field-in-view in turn. Energy sensor 204 gathers the energy that is reflected or received from objects in the field-of-view.

Depth calculation module 210 calculates the distances to objects in the field-of-view using the information acquired by energy sensor 204. As described previously, such depth calculation may performed using time-of-flight, or LIDAR, or pattern deformation, or any other method suitable for calculating depth measurements. Depth calculation module supplies depth data 220, where, for example, depth data 220 may be structured in a form similar to that shown in FIG. 1A.

In FIG. 2A, depth calculation module 210 uses the captured energy data from energy sensor 204 to calculate depth data 220 corresponding to the objects in the field-of-view. Such calculation may also rely on knowledge of the characteristics of the most recent energy characteristics or energy patterns emitted by energy emitter 202, and/or on past energy characteristics or energy patterns emitted by energy emitter 202, or captured by energy sensor 204, or on any other information required to carry out depth calculations.

Sensor portion 201 encapsulates a minimal set of components required by some embodiments of the present inventive method, viz., an energy emitter, an energy sensor, and a depth calculation module. Because of the similarity to energy sensor 204, optional color image sensor 206 is included for convenience within sensor portion 201. It is important to note that sensor portion 201 is a label of convenience, roughly corresponding to the typical hardware components required for some real-world embodiments of the present inventive method, and so any components of the present inventive method, including all of those, for example, shown in FIG. 2A, may be brought in or out of sensor portion 201. For example, optional skeleton calculation module 212 could appear inside sensor portion 201 in some embodiments of the present inventive method.

The depth data 220 may be used by optional skeleton calculation module 212 in order to construct optional skeleton data 222, consisting of a set of approximate spatial locations of anatomic joints (e.g., the [x, y, z] locations of shoulder, hip, and ankle). The data from depth calculation module 220 may also be used by optional pixel label calculation module 216 in order construct optional so-called "pixel label" data 226, consisting of labeling individual pixels in a depth map (such as the depth map shown in FIG. 1A) that correspond to a human being in the field-of-view. A wide variety of machine learning methods are known in the art that may be utilized by optional skeleton calculation module 212 and optional pixel label calculation module 216, and are not discussed further here.

Spatial measurement module 218 may use depth data 220 to calculate measurements in space, as described further below. Spatial measurement module 218 supplies spatial measurements 228. Spatial measurements 228 may further include any of at least three categories of measurements: first, measurements pertaining to humans within the field-of-view (e.g., the position of a person's arm, or where a person is standing within a room); second, measurements of inanimate objects within the field-of-view (e.g., the location of a table within a room); and third, measurements of animals within the field-of-view (e.g., where a dog is walking within a room).

Schematic generation module 230 uses spatial measurements 228 to create schematic output 232. Schematic output 232 is a representation of the field-of-view of sensor portion 201. For example, schematic output 232 may be a representation of the field-of-view that does not use visual data (photos or videos), in order to preserve the privacy of individuals within the field-of-view. For example, schematic output 232 may be a two-dimensional overhead representation of the field-of-view. For example, schematic output 232 may resemble a radar screen, in which moving objects (such as humans) are highlighted differently than stationary objects (such as furniture). For example, schematic output 232 may resemble a cartoon, in which cartoon-like avatars are used to represent humans.

In some embodiments of the present invention, schematic generation module 230 may generate schematic output 232 in such a way as to identify, recognize, or distinguish among different individuals. That is, if more than one person is in the field-of-view of sensor portion 201, schematic output 232 may display information to individually highlight or identify each person in the field-of-view.

For example, if two people are in the field-of-view, schematic output 232 might display (for example) a green color when representing person #1, and a yellow color when representing person #2. For example, if two people are in the field-of-view, then schematic output 232 might use a predetermined icon or graphic representation for person #1, and a different predetermined icon or graphic representation for person #2.

There are multiple ways to accomplish recognition, identification, or distinguishing among individuals, so that system 200 may distinguish among two or more different individuals using a variety of methods. In some embodiments of system 200, spatial measurements 228 may be used as biometrics to distinguish individuals from each other. Examples of biometric measurements may include, for example, arm length, shoulder-to-shoulder width, and the person's height. In general, collections of spatial measurements of a person's body may be used, in a manner similar to a fingerprint, to identify that person, and/or to distinguish users of system 200 from each other. The biometric use of spatial measurements 228 enjoys the advantage of not requiring color image data 224, thus helping to preserve privacy.

System 200 may further distinguish among two or more different individuals using facial recognition. Facial recognition methods are well known in the art and not described further here. Color image data 224 is, in general, required to enable facial recognition methods, because facial recognition methods usually require visual-spectrum information. Some embodiments of the present invention utilize optional color image data 224 in order to perform facial recognition and so recognize or distinguish individuals in the field-of-view from each other. In some embodiments of the present invention, so as to help preserve privacy, optional color image data 224 is acquired temporarily to enable facial recognition, but used for that purpose only briefly (e.g., in some embodiments, for approximately one second), and not transmitted further to other systems or individuals.

In general, system 200 may measure or monitor more than one individual at substantially the same time. As described herein, whenever any measurements, schematic outputs, or any other data or processes are put forth that pertain to a single individual, they may also pertain to more than one individual substantially simultaneously. For example, in some embodiments of system 200, spatial measurements 228 may be taken of more than one individual substantially simultaneously. For example, in some embodiments of system 200, schematic output 232 may contain indicia, markings, identifications, or the like, that correspond to, or distinguish among, more than one individual. Any utilization of the present invention for measuring or monitoring a single individual, may be applied as well, and without loss of generality or capability, to measuring or monitoring multiple individuals.

Though not shown in FIG. 2A for brevity, schematic generation module 230 may draw on any type of data in system 200—including depth data 220, optional skeleton data 222, optional pixel label data 226, or spatial measurements 228—to generate schematic output 232.

It is possible to calculate spatial measurements using only depth data 220, and doing so helps to preserve privacy because it obviates the need to use color image data (or, more generally, any kind of photographic or video data) concerning the field-of-view. However, in some applications it may be preferable to also include a standard color image sensor 206, which gathers visual data in the same way as a standard digital camera. Optional color image sensor 206 supplies optional color image data 224. For example, if it desirable to open a video channel when an emergency is suspected, then optional color image sensor 206 and optional color image data 224 can enable such a video channel. For many applications of system 200, however, the color image sensor 206 and the color image data 224 are optional.

As noted above, it is possible to calculate body measurements using only depth data 220. However, the speed of body measurement calculation may be improved by drawing upon additional calculations performed on depth data 220. For example, optional skeleton data 222 may be calculated from depth data 220, and used to improve the speed of calculating spatial measurements 228. For example, optional pixel label data 226 may be calculated from depth data 220, and used to improve the speed of calculating spatial measurements 228. As described previously, optional skeleton data 222 describes the approximate spatial locations of anatomic joints (for example, the three-dimensional [x, y, z] locations of shoulder, hip, and ankle). As described previously, optional pixel label data 226 distinguishes which pixels in a depth map (if any) correspond to a human being, and which do not.

In FIG. 2A, the depth data 220 consists of a set of calculated depth data, where such data may conform, for example, to the representation shown in FIG. 1A. The optional color image data 224 consists of a set of image data; such data may, for example, be represented in the same way as images that are acquired by a typical, everyday consumer digital camera, such as by using a pixel array or raster. The optional skeleton data 222 consists of a set of calculated spatial measurements of the approximate locations of portions of a user's body, for example, shoulders and knees; such data may, for example, be represented by a set of (x,y,z) coordinates. The optional pixel label data 226 consists of a set of pixel labels delineating which pixels correspond to a human being in the field-of-view; such data may, for example, be represented by a pixel array or raster.

Embodiments of the system 200 may utilize a combination of depth data 220, optional color image data 224, optional skeleton data 222, and optional pixel label data 226, to conduct measurements of an individual's body surface. The system 200 can utilize depth data 220 alone, at the potential cost of decreased accuracy and/or speed in some embodiments.

The sensor portion 201 of FIG. 2A may alternately utilize more than two image sensors. For example, the sensor portion 201 of FIG. 2A may be augmented with a third image sensor (not shown), which may overlap in energy type or frequency with either the energy sensor 204 or the optional color image sensor 206, in order to provide an additional nearby stereoscopic vantage point by which to increase accuracy of depth calculations. Or, multiple sensor portions 201 may be combined—for example, by placing a different sensor portion 201 in each room of a house, then combining together their collective data to cover a larger area than a single sensor portion 201 is capable of covering.

Figure 2B:
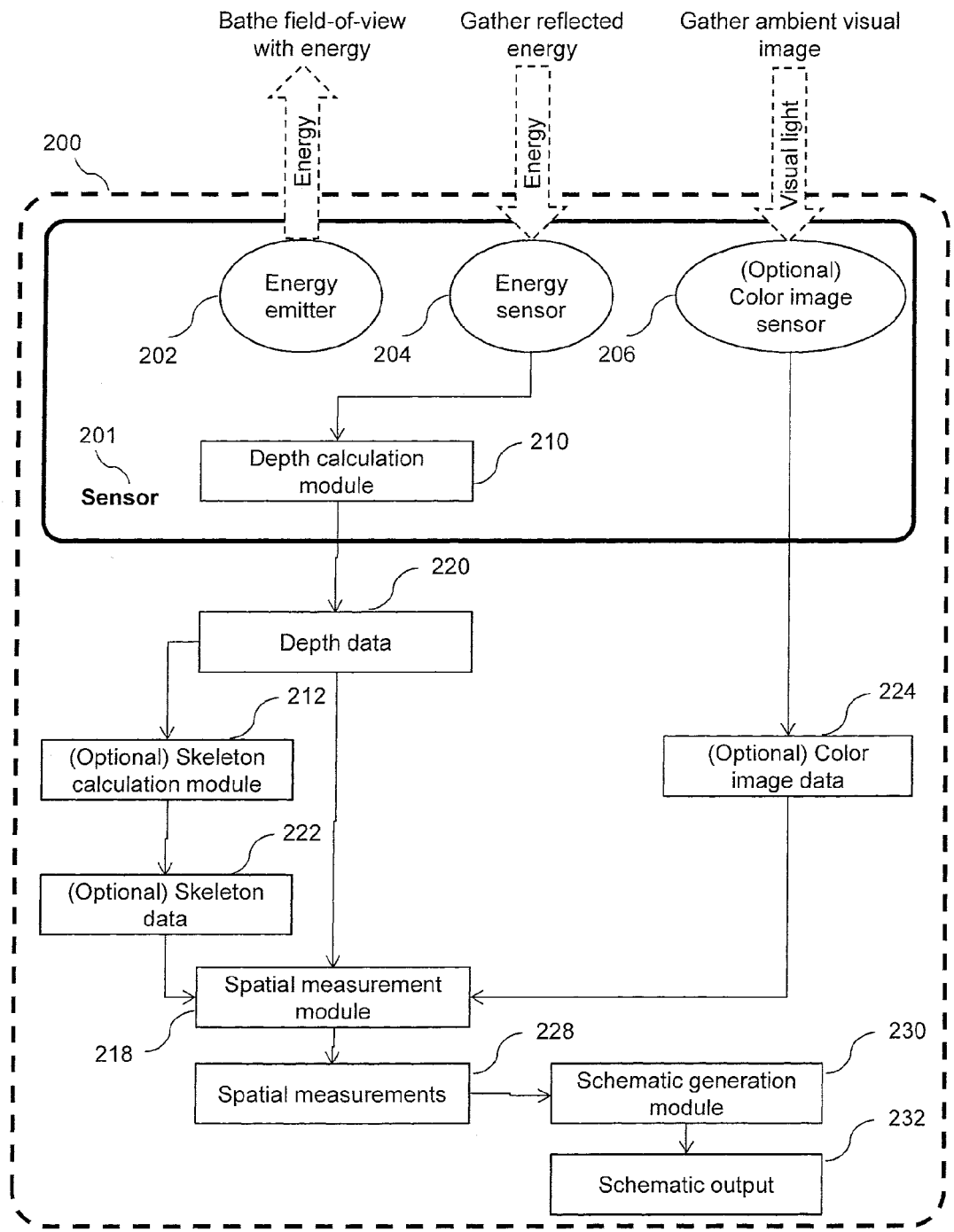

FIG. 2B shows another embodiment of the present inventive method. FIG. 2B is similar to FIG. 2A, except that optional pixel label calculation module 216 and optional pixel label data 226 of FIG. 2A are omitted, to emphasize that they are not required for some embodiments. Items in FIG. 2B correspond to their like-numbered items in FIG. 2A.

FIG. 2C shows another embodiment of the present inventive method. FIG. 2C is similar to FIG. 2A, except that optional color image sensor 206 and optional color image data 224 of FIG. 2A are omitted, to emphasize that they are not required for some embodiments of the present inventive method. Items in FIG. 2C correspond to their like-numbered items in FIG. 2A.

FIG. 2D shows another embodiment of the present inventive method. FIG. 2D is similar to FIG. 2A, except that optional pixel label calculation module 216 and optional pixel label data 226 and optional color image sensor 206 and optional color image data 224 of FIG. 2A are omitted, to emphasize that they are not required for some embodiments of the present inventive method. Items in FIG. 2D correspond to their like-numbered items in FIG. 2A.

Figure 2E:
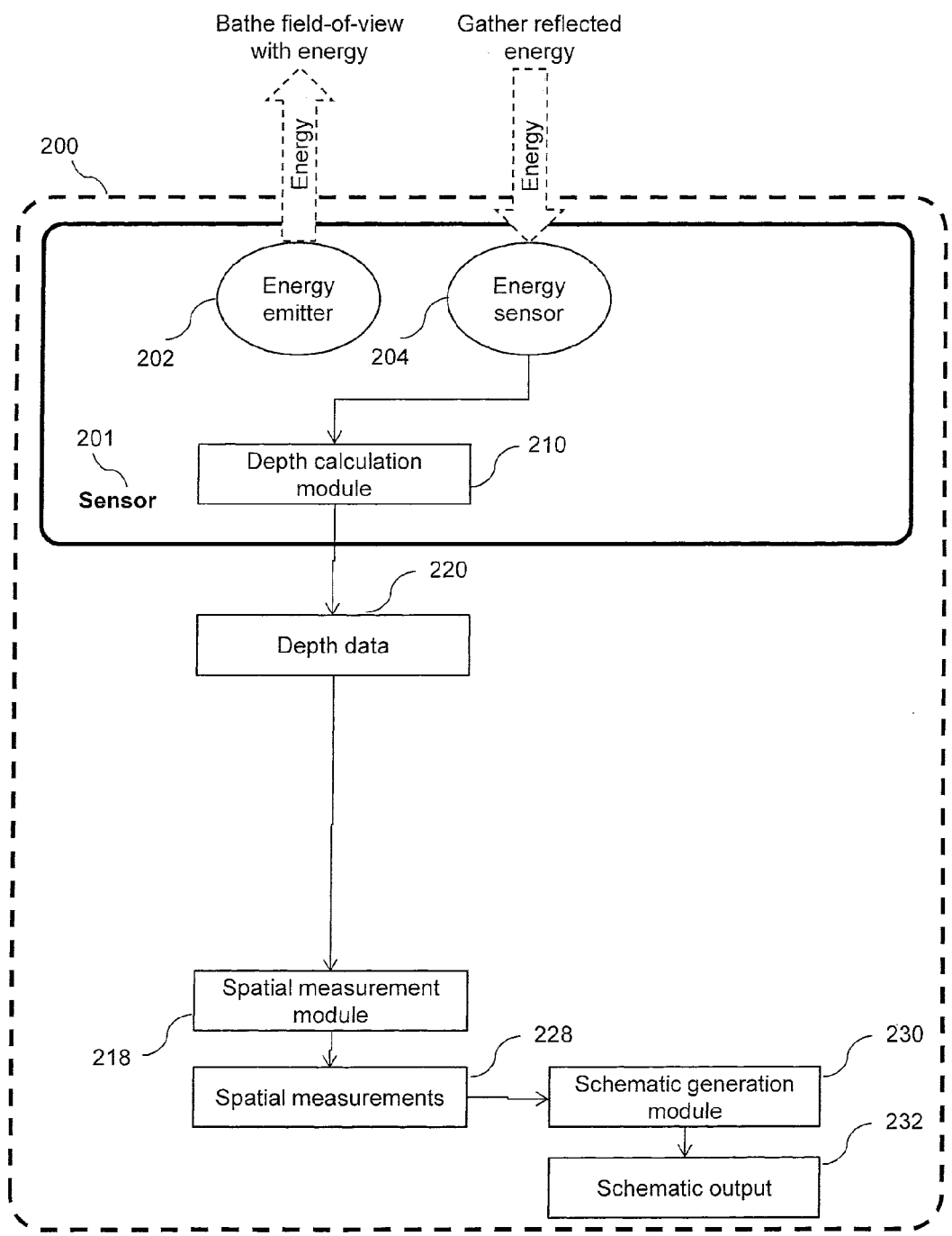

FIG. 2E shows another embodiment of the present inventive method. FIG. 2E is similar to FIG. 2A, except that optional skeleton calculation module 212 and optional skeleton data 222 and optional pixel label calculation module 216 and optional pixel label data 226 and optional color image sensor 206 and optional color image data 224 of FIG. 2A are omitted, to emphasize that they are not required for some embodiments of the present inventive method. Items in FIG. 2E correspond to their like-numbered items in FIG. 2A.

FIG. 2F shows another embodiment 270 of the present inventive method. FIG. 2F shows an example of the present inventive method that uses pattern-deformation and infrared (IR) light to acquire depth measurements. In FIG. 2F, IR pattern emitter 272 is analogous to energy emitter 202 of FIG. 2A. In FIG. 2F, IR pattern sensor 274 is analogous to energy sensor 204 of FIG. 2A. In FIG. 2F, optional color image sensor 276 is analogous to optional color image sensor 206 of FIG. 2A. In FIG. 2F, depth calculation module 280, optional skeleton calculation module 282, depth data 290, optional skeleton data 292, and optional color image data 294, are analogous to their counterparts (respectively) 210, 212, 220, 222, 224 of FIG. 2A.

In FIG. 2F, optional pattern pre-processing module 275 may clean, sharpen, remove noise from, or otherwise modify the information from IR pattern sensor 274. In FIG. 2F, optional color image pre-processing module 277 may clean, sharpen, remove noise from, or otherwise modify the information from optional color image sensor 276.

Referring again to FIG. 2A, energy sensor 204 may optionally be accompanied by a pre-processing module (not shown) analogous to optional pattern pre-processing module 275. The optional color image sensor 206 may optionally be accompanied by a pre-processing module (not shown) analogous to optional color image pre-processing module 277. Alternatively, in FIG. 2A, any pre-processing—if needed—analogous to components 275 and 277 of FIG. 2F may be incorporated within (respectively) energy sensor 204 and optional color image sensor 206.

In FIG. 2F, depth calculation module 280 draws on the information transmitted by optional pattern pre-processing module 275—or directly on IR pattern sensor 274, if pattern pre-processing module 275 is not present—and may optionally also draw on the information transmitted by optional color image pre-processing module 277—or optionally directly on optional color image sensor 276, if color image pre-processing module 277 is not present—in order to calculate depth data 290.

The color image itself, if present, may also be maintained separately as optional color image data 294. The depth data calculation module 280 does not require information from color image pre-processing module 277 or optional color image sensor 276, but may optionally utilize such information to improve the accuracy of depth data 290.

The data from any combination of IR pattern sensor 274, optional pattern pre-processing module 275, optional color image sensor 276, optional color image pre-processing module 277, and depth calculation module 280, may be used by optional skeleton calculation module 282 in order to construct optional skeleton data 292, consisting of a set of approximate spatial locations of anatomic joints (for example, the [x, y, z] locations of shoulder, hip, and ankle). Similar to the depth calculation module 280, the skeleton calculation module 282 requires only information from IR pattern sensor 274 and/or optional pattern pre-processing module 275, and preferably information from depth calculation module 280.

Although not shown in FIG. 2F, components analogous to optional pixel label calculation module 216 and optional pixel label data 226 of FIG. 2A may be placed in an analogous relationship in FIG. 2F as their counterparts in FIG. 2A. For example, an optional pixel label calculation module in FIG. 2F (not shown) could receive the same inputs as optional skeleton calculation module 282, and produce optional pixel label data (not shown), as described previously. For brevity, FIG. 2F does not display such analogs to optional pixel label calculation module 216 and optional pixel label data 226 of FIG. 2A.

Once the input data for body measurements (depth data 290, optional skeleton data 292, optional color image data 294, and/or optional pixel label data [not shown]) are obtained, the system 200 may utilize a computer 298, including a processor 295, RAM 296, and ROM 297, to execute a series of operations on the input data in order to produce spatial measurements and to generate a schematic output, as described further below. Alternatively, such processing may be performed by dedicated hardware chips and circuits, each of which may have their own internal processor.

The resulting body surface measurements and schematic output may be placed into a data storage device 284, shown on a display device 285, and/or transmitted over a communication interface 286, such as the Internet, or any suitable network. The system may be operated by the user through user input 287; such input may include hand gestures, voice commands, keyboard, mouse, joystick, game controller, or any other type of user input.

In some embodiments of system 270, the depth calculation module 280 is a component of (or calculated by) computer 298, rather than sensor portion 271. In some embodiments of system 270, the optional skeleton calculation module 282 is a component of (or calculated by) computer 298, rather than sensor portion 271. In some embodiments of system 270, the optional pixel label calculation module (not shown) is a component of (or calculated by) computer 298, rather than sensor portion 271. In general, depth data 290, optional skeleton data 292, and optional pixel label data (not shown) may be generated by modules at various points within system 270, so that their generation is not limited to sensor portion 271.

Because system 200 and system 270 perform similar functions, and share similar inputs and outputs, we will use "system 200" herein to refer interchangeably to both system 200 and system 270, unless otherwise noted. Similarly, and for the same reasons, sensor portion 201 and sensor portion 271; energy emitter 202 and analogous IR light emitter 272; energy sensor 204 and analogous IR pattern sensor 274; optional color image sensor 206 and 276; depth calculation module 210 and 280; optional skeleton calculation module 212 and 282; depth data 220 and 290; optional skeleton data 222 and 292; optional color image data 224 and 294; will each be referred to interchangeably, unless otherwise noted.

The system 200 (or system 270) may measure the user or environment extremely quickly, and with minimal requirements to pose or position the body. In particular, for an individual measurement of the user, the system 200 requires only a single data-snapshot of the user. Thus, in some embodiments, the user may need to stand relatively still for only a predetermined amount of time, for example 0.001 second to 0.1 second, which in an optical camera, may be determined by the amount of lighting, shutter speed, and aperture size. Other types of image capture or energy capture devices may operate on a much faster basis so that such capture is substantially instantaneous, at least from the perspective of the user.

In other embodiments, the user need not necessarily stand in one position or maintain a particular position for any amount of time, and may be able to move in real-time within the field of view of the image capture device. Individual measurements from different data-snapshots may also be combined or operated upon further, for example by adding them or averaging them, as described below.

The term "data-snapshot" or "snapshot", as used herein, refers to a single set of depth, and/or image, and/or skeleton data, and/or pixel label data, wherein the data are gathered substantially simultaneously with each other. As noted previously, a single data-snapshot cannot account for any "invisible" or "dark side" aspects of objects in the field-of-view. Where necessary to complete a measurement, therefore, the system 200 may "fill in" for invisible aspects by using heuristics.

The original construction of optional skeleton data 222 may utilize multiple calculations on depth and/or image data over time. The system 200 is agnostic as to the means by which optional skeleton data 222 are generated. From the point of view of the system 200, a single—substantially instantaneous—data-snapshot of depth, and/or image, and/or skeleton data, and/or pixel label data, is sufficient to obtain a particular spatial measurement, regardless of the prior post-processing that was necessary to generate the content of that data-snapshot.

Similarly, the original construction of depth data may utilize multiple calculations on data received from either energy sensor 204 or optional color image sensor 206 individually, or from both energy and color image sensors 204 and 206 collectively over time. For example, a particular image received at one moment in time by either energy sensor 204 or optional color image sensor 206 may serve as a so-called reference image at a subsequent moment in time, such that two or more images taken slightly apart in time are used to calculate depth data. Again, the system 200 is agnostic as to the means by which depth data, including depth data 220, are generated, including image processing that may occur over time, or different physical methods such as time-of-flight, LIDAR, or pattern deformation.

Through the use of a substantially instantaneous snapshot of data, gathered from one or more stationary cameras, the system 200 may avoid the use of body-worn devices such as accelerometers, or the wearing of special clothing, or the use of visual images such as from video cameras. As is described further below, this method also avoids the need for manual intervention—in particular, the need for a second person to conduct body measurements. Some embodiments of the system 200 may be thought of as creating a "virtual radar" or a "smart radar" that generates a privacy-respecting representation of a field-of-view. (The use of the term "radar" here is illustrative and analogous to the popular depiction of radar-like screens in TV shows and movies; some embodiments of the system 200 may not use radar technologies per se.)

In some embodiments of system 200, energy sensor 204 and optional color image sensor 206 may be placed near each other, as a substantially co-located array, rather than being physically dispersed throughout different points on the perimeter of a field-of-view. Such co-location is ideally as close as possible in order to have the field-of-view be similar for each sensor. The feasible co-location separation distance depends upon the size of the physical components. For example, if energy sensor 204 and optional color image sensor 206 are instantiated as CMOS chips, the chips and their supporting electronics and optics may be placed such that their borders are, for example, approximately 5 mm apart, and the centers of their lenses are, for example, approximately 2 cm apart.

In general, the co-located sensors are preferably positioned with a separation distance of millimeters to centimeters, although smaller and larger distances are possible. Similarly, the angles of view of the co-located sensors are preferably within a few degrees of each other. This means that embodiments of the present system and method may be very compact and portable, e.g., fitting easily on a shelf or at the base of a television at home.

Figure 3A:
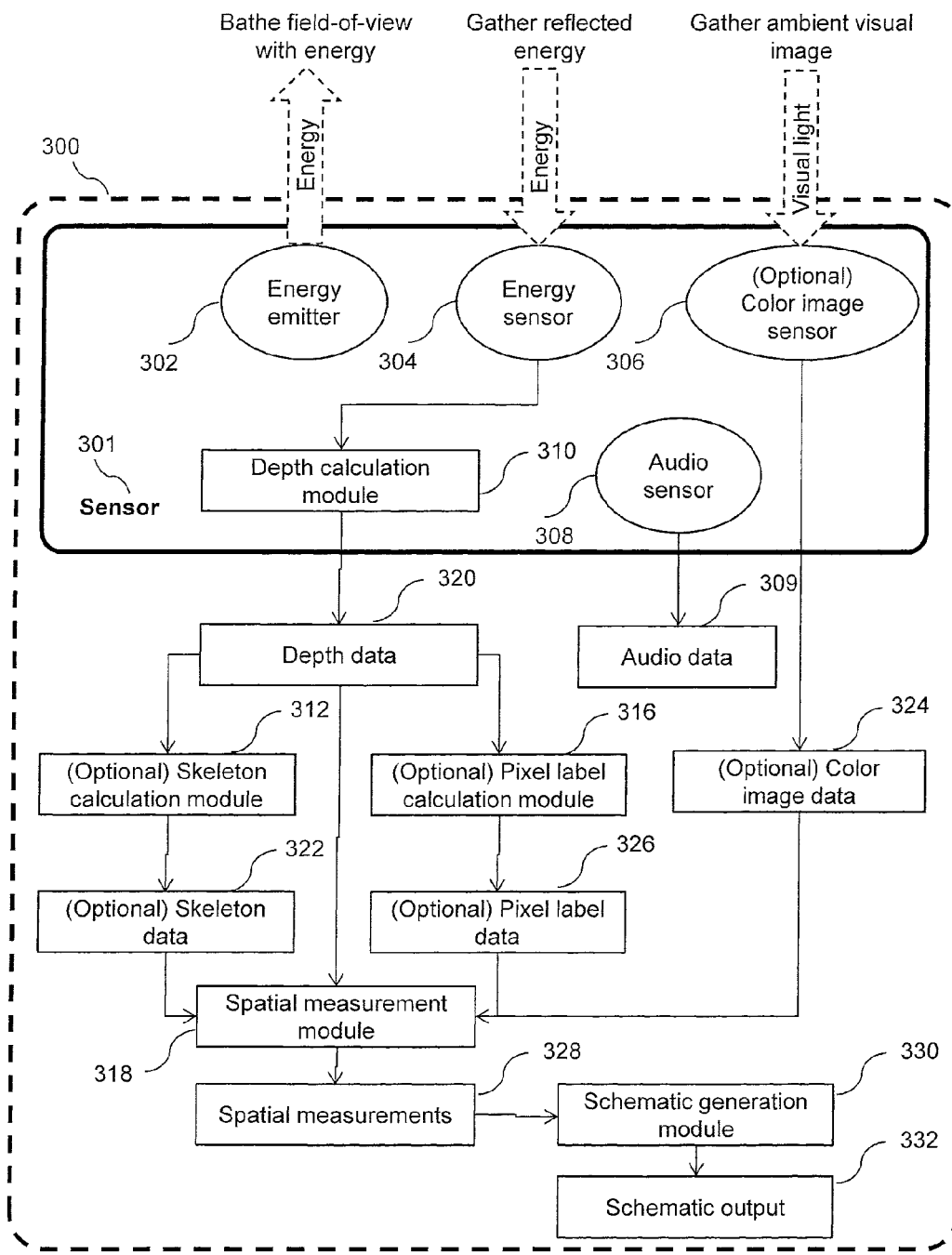
FIGS. 3A and 3B show additional block diagrams according to specific embodiments of the present system and method.

FIG. 3A shows another block diagram of an embodiment of the present system and method. A system for monitoring individuals while protecting their privacy (the system) is shown generally as 300, which may be used to carry out the method described in this document. As compared to FIG. 2A, FIG. 3A demonstrates the addition of a sensor to detect audio (sound) in the environment, in particular, the sound of the user's speech. In FIG. 3, items 300 to 332, with the exception of 308 and 309, are equivalent to their like-numbered items in FIG. 2A. Audio sensor 308 captures ambient audio, for example, through the use of a microphone or microphone array, and outputs audio data 309. Audio data 309 may be represented in any way appropriate for conveying sound or an audio signal, for example, as an analog waveform, or as a digital mp3 data file.

Figure 3B:
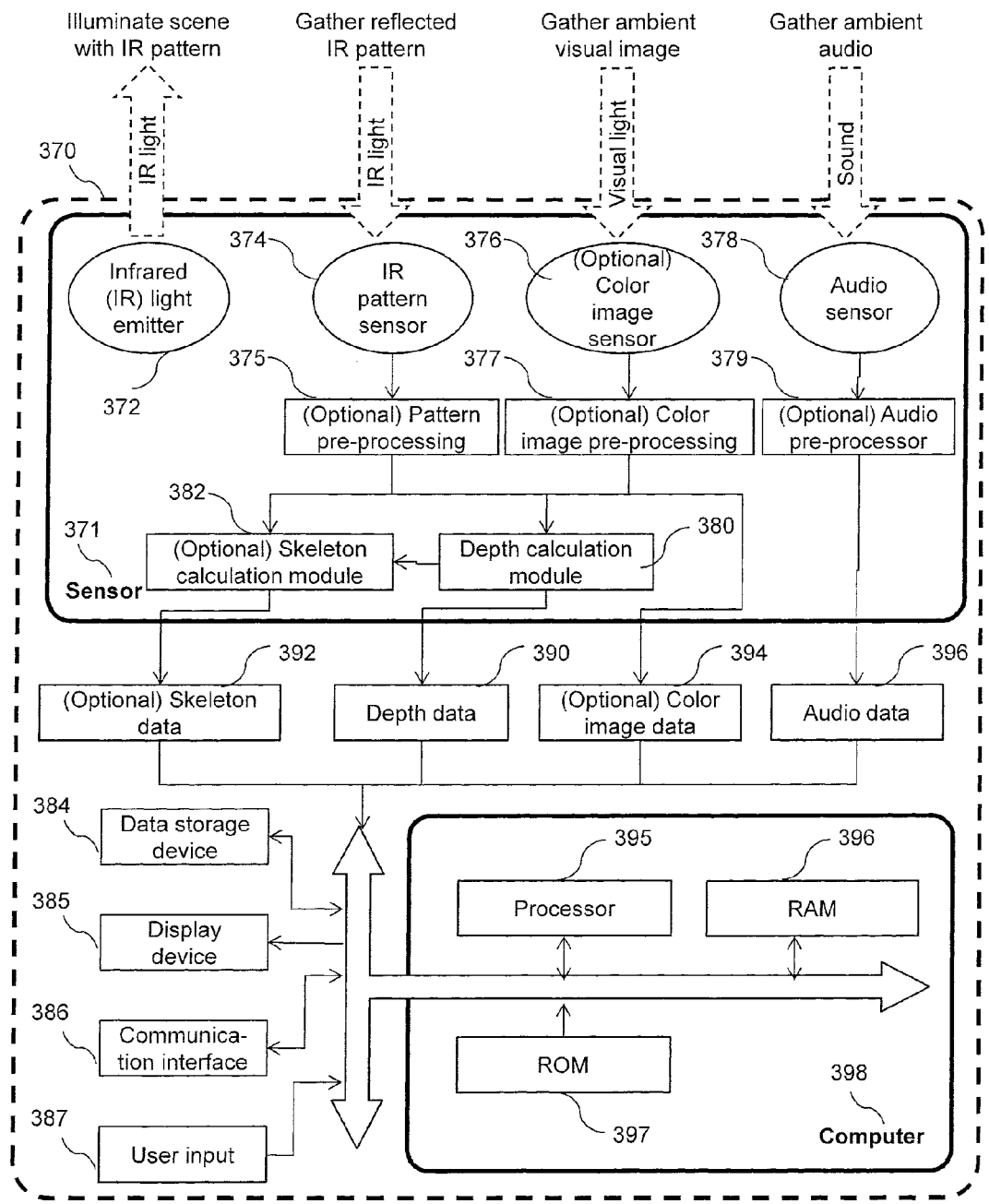

FIG. 3B shows another block diagram of an embodiment of the present system and method. A system for monitoring individuals while protecting their privacy (the system) is shown generally as 370, which may be used to carry out the method described in this document. As compared to FIG. 2F, FIG. 3B demonstrates the addition of a sensor to detect audio (sound) in the environment, in particular, the sound of the user's speech. In FIG. 3B, items 370 to 398, with the exception of 378, 379, and 396, are equivalent to their like-numbered items in FIG. 2F.

Audio sensor 378 captures ambient audio, for example, through the use of a microphone or microphone array. Optional audio preprocessor 379 carries out any desired preprocessing on the data received from audio sensor 378. An example of preprocessing would be identifying the physical location in space, relative to the audio sensor 378, from which the sound emanated, by comparing two audio data streams (stereo signal) against each other. The output audio data 396 conveys any desired combination of raw and preprocessed audio data to other parts of the system 370, including the computer 398. Audio data 396 may be represented in any suitable way appropriate for conveying sound or an audio signal, for example, as an analog waveform, or as a digital mp3 data file.

System 300 (or system 370), as a superset of system 200, can by definition perform all functions that system 200 (or system 270) can perform. For reasons of brevity, this document will often refer to "system 200" instead of "system 200 and/or system 270 and/or system 300 and/or system 370", but it should be understood that "system 300" (or "system 370") can be substituted in place of "system 200" (or "system 270"). The converse is not true, because system 300 (or system 370) possesses audio capabilities that system 200 (or system 270) does not possess.

Depth calculation module 210, optional skeleton calculation module 212, optional pixel label calculation module 216, spatial measurement module 218, schematic generation module 230, and all other modules described herein, may be implemented in circuitry as a physical component or processing element, whether integrated or discrete, or may be implemented to the extent possible, in software to be executed by the processor or specialized processing circuitry.

For a single measurement, certain embodiments of the system 200 may require only a single data-snapshot of the user, taken from a single point of view. This is because the system 200 may use heuristics—such as the inherent symmetry of the human body—to "fill in", or compensate for, any invisible depth or image information that is invisible to the sensor portion 201. Furthermore, multiple measurements may be drawn from a single snapshot.

One reason that multiple data snapshots may be preferable is due to noise in the system. If the inputs or outputs at any component of sensor portion 201 are noisy—that is, varying randomly or non-randomly, due either to inherent aspects of sensor portion 201 or to external environmental conditions, then multiple data snapshots may be required to extract improved signal from the noisy background. For example, data snapshots may be averaged over time, using signal processing methods, in order to have noise "cancel out" and thereby diminish over time, while constructively adding together (strengthening) the valuable signal. If such averaging over time is performed, then multiple data snapshots may be required for higher-accuracy measurements.

One reason that multiple data snapshots may be required is to track or to monitor spatial measurements over time. For example, tracking the location of an individual within a room over time requires corresponding multiple data snapshots over time. In some embodiments of the system 200, to track measurements that change over time, measurements may be acquired at a sampling rate ranging from approximately 30 data snapshots per second, to approximately 1 data snapshot per 30 seconds. The duration of time during which measurements are tracked may be predetermined. For example, in some embodiments of the system 200, measurements may be carried out on an ongoing basis, indefinitely (e.g., until the user chooses to stop the system 200 from running). In other embodiments of the system 200, measurements may be carried out only during certain time intervals (e.g., only during daytime).

Therefore, although any one measurement may require only a single snapshot, nonetheless, in some embodiments, more than one snapshot may be used to obtain a complete set of desired measurements, or to track how measurements change over time.

Figure 4A:
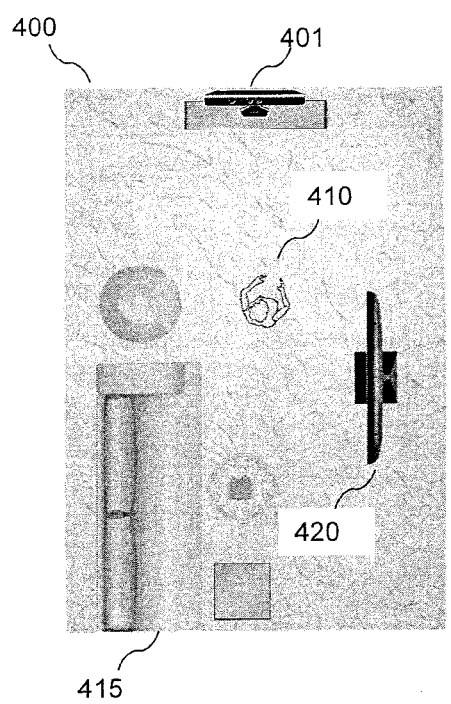
FIG. 4 shows transformation of depth measurements from 3D to 2D according to a specific embodiment of the present inventive method.
Figure 4B:
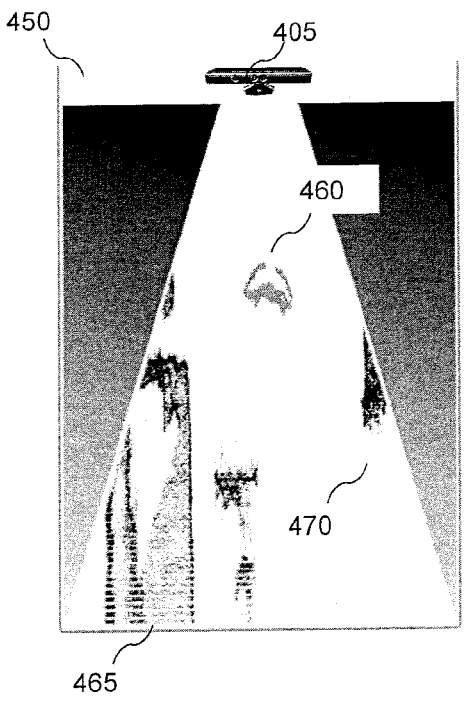

FIGS. 4A and 4B show an example of transforming the three-dimensional depth measurements acquired by system 200 into a two-dimensional representation that is suitable for monitoring an individual while preserving privacy. FIG. 4A shows an example of an individual 410 standing in a living room 400. The sensor portion 201 is embodied as a sensor device 401 placed, in this example, on a table or counter within living room 400. The living room 400 may contain a variety of furniture, for example, television set 420 and couch 415. In the example of FIG. 4, the system 200 may utilize sensor portion 201 (embodied as sensor device 401) to acquire depth data 220 from a field-of-view within the living room 400.

Each element of the depth data—that is, each pixel in the depth map of FIG. 1A—corresponds, as shown in FIG. 1A, to a distance from the sensor device 401 to a nearest-object in the field-of-view. Furthermore, in the example of FIG. 4, the system 200 may use the depth data to identify the presence of human being 410 in the field-of-view. For example, optional pixel label data 226 may be used to identify the presence of human being 410. Note that system 200 may also identify the presence of multiple human beings in the field-of-view, and distinguish them from each other; this is not shown in FIG. 4.

FIG. 4B shows the result of mathematically transforming the 3D depth data of the living room 400 into a 2D depth data representation 450. The 2D data representation 450, in the example of FIG. 4, is an overhead schematic of the living room 400. Note that any schematic, such as a side schematic or even angular-slice schematic, could have been generated instead of an overhead schematic. The 2D pixels representing the individual being monitored 460 correspond to the 3D depth measurements that were identified by the system 200 as belonging to the human being 410, as described further below. The 2D data representation of the television set 470 corresponds to the living room television set 420, and the 2D representation of the couch 465 corresponds to the living room couch 415.

The 2D depth representation 450 can be created from the 3D depth data of the living room 400 in a variety of ways. One way is to create 3D computational "meshes" from the 3D data, as is known in the art, and then to mathematically shift the user's viewpoint of that mesh to an overhead view.

Figure 5A:
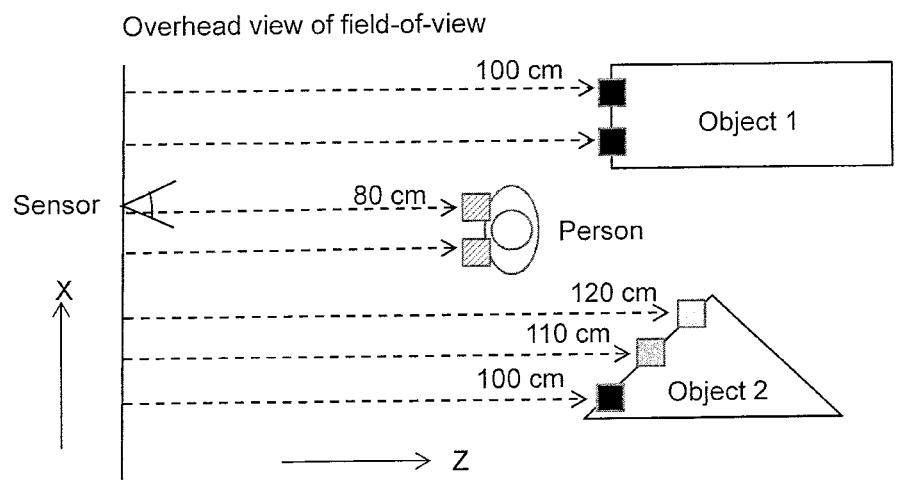
FIG. 5 shows rapid transformation of 3D spatial measurements into 2D schematics.
Figure 5B:
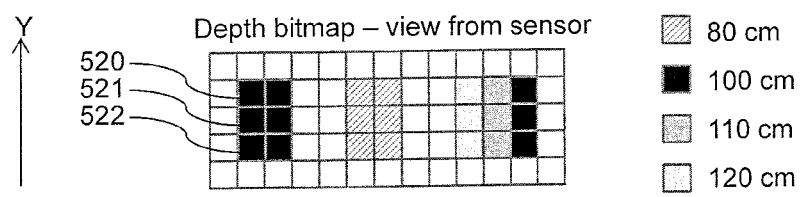
Figure 5C:
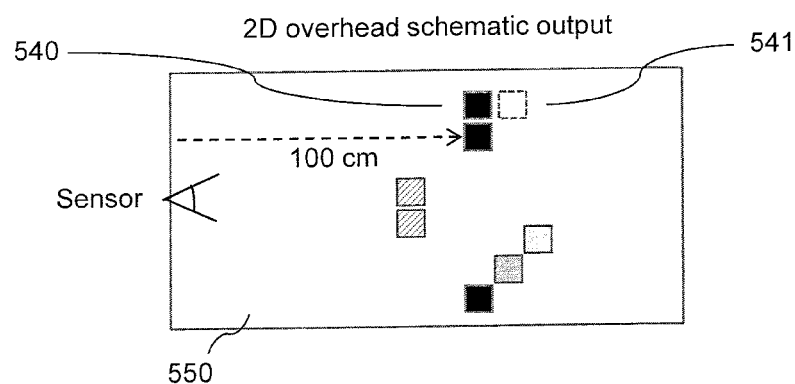

FIGS. 5A-5C shows a simpler and more rapid way of transforming the 3D depth data to a 2D schematic view. The method shown in FIGS. 5A-5C enjoys the advantage of low computational requirements, allowing it to run on low-end, affordable hardware embodiments. FIG. 5A shows a person standing in a field-of-view, flanked on either side by an inanimate object. The nearest border of the person is 80 cm from (the vertical plane defined by) sensor portion 201; the nearest border of object 1 is 100 cm from (the vertical plane defined by) sensor portion 201; and several nearest points along the border of object 2 are 100, 110, and 120 cm from (the vertical plane defined by) sensor portion 201.

FIG. 5B shows a depth map produced by sensor portion 201. This depth map corresponds to depth data 220 in FIG. 2A. The diagonally-shaded pixels correspond to the nearest border of the person at 80 cm, at approximately the middle of the field-of-view. The black-shaded and grey-shaded pixels in FIG. 5B similarly correspond to borders of objects 1 and 2, flanking the person.

In FIG. 5B, the depth map pixels corresponding to a person are shaded with a diagonal pattern to highlight the fact that, for example, if optional pixel label data 226 are available, the pixels corresponding to the person can be "labeled" as belonging to a person and not to an inanimate object.

FIG. 5C shows a two-dimensional (2D) schematic 550 of the field-of-view, generated from the depth map in FIG. 5B. Wherever a pixel appears in the depth map of FIG. 5B, a corresponding pixel is placed in the 2D schematic 550, at the appropriate depth-value distance for that pixel. Multiple pixels in the depth map may correspond to the same pixel in the schematic. For example, each of pixels 520, 521, and 522 in the depth map of FIG. 5B are transformed into the same place in FIG. 5C, pixel 540, corresponding to a distance of 100 cm from sensor portion 201. If pixel 520 had contained a greater depth value than pixels 521—for example, if object 1 were shaped like a triangle vertically, so that its top part was farther away from sensor portion 201 than its bottom part—then pixel 520 would have been transformed into a different place in FIG. 5C, shown as pixel 541.

As shown in FIG. 5C, schematic pixels may be colored or labeled to convey additional information. For example, schematic pixels may be colored blue if they correspond to an inanimate object, and colored green if they correspond to a human being.

In some embodiments of system 200, 2D schematic 550 may show only the outlines or "shells" of the various objects in the field-of-view. This may happen when sensor portion 201 is unable to generate depth data corresponding to the "dark sides" or hidden aspects of objects. For example, the 2D schematic 550 contains pixels only corresponding to the sensor-facing aspects of the person and the two objects in FIG. 5A. The back of the person, and the backs of object 1 and object 2, are absent from 2D schematic 550.

In some embodiments of system 200, 2D schematic 550 may be augmented with "memory" about objects in the field-of-view. As used herein, "legacy data" refers to information stored about objects in the field-of-view. For example, depth data corresponding to objects in the field of view may be stored as legacy data. For example, if data about object 1 (in FIG. 5A) was acquired by system 200; and subsequently, a person entered the field-of-view and stood between sensor portion 201 and object 1, thus hiding or "shadowing" object 1 from view; then system 200 could still "fill in" object 1 in 2D schematic 550 using past legacy data about object 1.

Returning to FIGS. 4A and 4B, the transformation from 3D depth data into 2D representation can be performed in a wide variety of ways and result in a wide variety of representations. For example, the overhead view 450, corresponding to schematic output 232, could have been rendered as a side view (as opposed to an overhead view) of the individual 410. For example, schematic output 232 could be represented as an animated stick-figure or cartoon of a user, mirroring the user's movement over time.

As demonstrated in the example of FIG. 4, some embodiments of the present invention are evocative of aircraft radar or medical ultrasound. This is because such embodiments of the present invention acquire non-visual data—specifically, depth data—and use that depth data to reconstruct a view of a scene that cannot be used to discover the visual appearance of objects in the scene, which is analogous to the way aircraft radar or medical ultrasound reconstructs a view of a scene that cannot be used to discover the visual appearance of objects in the scene.

However, the mechanisms through which such views are constructed are very different that the embodiments of the present invention, and both aircraft radar and medical ultrasound, and their purposes and mechanisms, are completely different. The analogy herein is intended only to aid in comprehension of the present invention's utility. In the example of FIG. 4, clearly aircraft radar and medical ultrasound would not be feasible technologies for monitoring an individual in a living room.

Returning to FIG. 5, embodiments of system 200 may use optional skeleton data 222 and/or optional pixel label data 226 to identify which pixels correspond to individuals, and which pixels correspond to inanimate objects.

Skeleton data 222, if present, generally consist of approximate locations of nebulously defined portions of the body, or collections of anatomic structures. Skeleton data can be thought of as guideposts or landmarks of general regions of the human body. Most often, they correspond to joints of the human skeleton, such as the shoulder or knee, because machine recognition algorithms may be employed to recognize structures that stay relatively constant in shape while moving, such as arms and legs, and therefore these algorithms may also be used to identify the approximate articulation regions between, say, arms and legs.

An example of skeleton data would be the approximate 3D spatial location of the right shoulder joint. The right shoulder joint is of nebulous definition both structurally and spatially; it consists of multiple anatomic components (portions of the arm, ribcage, surrounding musculature, and so forth) and cannot be precisely located on the human body, only approximately outlined.

Returning to FIG. 5, skeleton data 222 may be used to help label pixels that are located near specific anatomic regions of an individual's body. Pixel label data 226, if present, consist of labels that may be applied to individual pixels in depth data 220, or to individual pixels in optional color image data 224. The use of these labels, when they are present, is to distinguish human beings from each other, and from the ambient environment, in a field-of-view.

For example, if depth data 220 were represented by a 640 by 480 pixel depth map of a field-of-view, and if the depth pixel at coordinate (400, 200) corresponded to a distance to a portion of the body surface of a human being; the depth pixel at coordinate (500, 300) corresponded to a distance to a portion of the body surface of a different human being; and the depth pixel at coordinate (20, 50) corresponded to a distance to a door or a wall in the local environment, then depth pixel (400, 200) might be labeled "person #1", depth pixel (500, 300) might be labeled "person #2", and depth pixel (20, 50) might be labeled "non-person".

Similar reasoning applies to optional color image data 224. In sum, if depth data 220 or optional color image data 224 are represented as pixels—for example, in an array or raster representation—such pixels may be attached with labels that distinguish whether the pixel corresponds to a person or a non-person, and if a person, an arbitrary identifier for the person, where such labels are maintained in system 200 as optional pixel label data 226.

Both optional skeleton data 222 and optional pixel label data 226 generally cannot be used to precisely locate and track (over time) a specific portion of the human body. Optional pixel label data 226 are generally able to signify, for example, that a specific pixel in a particular data snapshot belongs to a surface of a human body and not the ambient environment; or that two different pixels belong to two different human bodies.

Optional pixel label data 266 generally cannot uniquely identify a person's identity (for example, they cannot label that a person is "John H. Watson who lives at 221B Baker Street", as opposed to "person #1"), nor can optional pixel label data 226 generally label a portion of a body (for example, they cannot label that a pixel belongs to "person #1's right shoulder" as opposed to just "person #1"). Optional pixel label data 266 are therefore equivalent to a type of "mask", as the term is known in computer science—applying this pixel label "mask" to depth data 220 or to optional color image data 224 highlights which pixels, if any, correspond to an arbitrarily numbered human being.

Returning to FIG. 5, pixel label data 226 may be used to help label pixels that correspond to one or more individuals in the field-of-view.

A wide variety of methods to calculate skeleton data and/or pixel label data as outputs, using depth data and/or color image data as inputs, are known in the art, and may draw upon machine learning, statistical, or other technologies or methods. For example, the Microsoft Kinect For Windows Software Development Kit (SDK), from Microsoft Corp. of Seattle, USA, provides software routines to calculate skeleton data and pixel label data (called "player identification" in the Kinect for Windows SDK) from depth data and/or color image data.

For example, the OpenNI open-source software framework, under the auspices of the OpenNI Organization, similarly provides software routines to calculate skeleton data (called "joint data" in OpenNI) and pixel label data (called "figure identification" in OpenNI) from depth data and/or color image data. The Kinect for Windows SDK and the OpenNI framework employ different computational methods, utilize different APIs, have different operating characteristics, and represent information differently. They are mentioned here as illustrations of potential methods, which are commercially available, to calculate skeleton data 222 or pixel label data 226. The system 200 is agnostic as to the means by which skeleton data 222 or pixel label data 226 are generated.

Note that some embodiments of the present inventive method use types of energy, such as infrared light from IR light emitter 272, that cannot penetrate worn garments. Other embodiments may employ energy patterns that are able to penetrate worn garments. However, because such penetrating radiation may be harmful to human health, or may pose privacy hazards, some embodiments preferably rely on emitted energy of types, such as infrared, that do not penetrate worn garments.

For many applications, such as gait analysis, it is important to be able to measure either the surface of the human body directly, or of interposed worn garments that closely approximate the surface of the human body. As a result, some embodiments may place constraints on the nature of the clothing worn during execution of a particular application. For example, an application to track smoothness of arm motion for a Parkinson's Disease patient may require the user to wear a relatively tight-fitting shirt, rather than, say, a billowy parka.

In the descriptions and Figures that follow, it should be appreciated that only depth data are required to carry out body measurements. For example, depth data alone—or, optionally, a combination of depth data, and the skeleton data that are calculated from the depth data—may be sufficient to carry out a measurement of stride length, because such data may enable identification of all necessary body landmarks (e.g., points on the foot and ankle) and measure distances between those landmarks.

In other cases, depth data are preferably combined with color image data, or a combination of depth data, calculated skeleton data, calculated pixel label data, and color image data may be preferable. In general, identifying the position of a body landmark requires utilizing some combination of depth data 220, optional skeleton data 222, optional pixel label data 226, and optional color image data 224, but the specific combination, and the specific requisite calculations carried out on that combination, differ from landmark to landmark.

Figure 6:
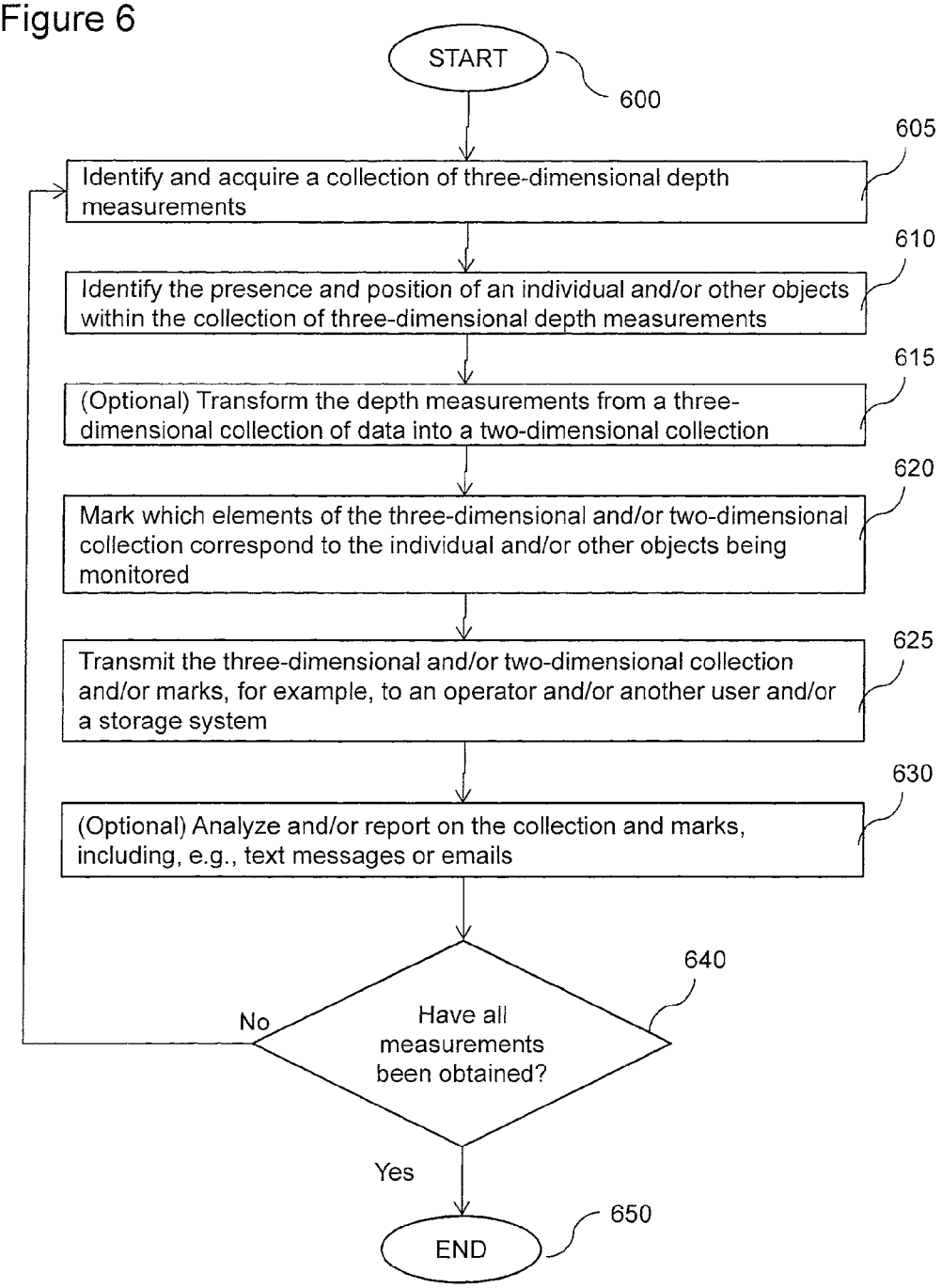
FIG. 6 shows a high-level flowchart according to a specific embodiment of the present inventive method.

FIG. 6 shows a high-level flowchart describing a preferred embodiment of the present inventive method, beginning at step 600. In Step 605, a collection of 3D measurements is identified and acquired. For example, Step 605 might include the collection of measurements relevant to an individual standing, walking, or sitting in his/her living room. In Step 610, the presence and position of the individual(s) being monitored is identified within the collection of 3D depth measurements—in other words, the individual is segmented out of the 3D depth data. This may be done through a variety of methods. For example, presence and position of the individual in step 610 may be ascertained in detail through body measurements, as described above, and also described in patent applications referenced in the above priority claim, which are incorporated herein by reference.

For example, presence and position of the individual in step 610 may be ascertained approximately by performing a so-called "diff" or "difference" operation over time, wherein those depth pixels that change values substantially are assumed to correspond to a moving human being, and those depth values that stay substantially constant are assumed to correspond to inanimate objects such as furniture.

Note that step 610, in identifying an individual within the field-of-view, also indirectly identifies inanimate objects, such as furniture. For example, in some embodiments of system 200, any object that is not a human may be assumed to be an inanimate object. For example, in some embodiments of system 200, any object that is not a human, but which location changes over a time period of approximately seconds to minutes, may be assumed to be an animal. Though not shown in FIG. 6, some embodiments of system 200 may store measurements of inanimate objects over time as legacy data, as described previously, so that if, for example, a human being enters the field-of-view and temporarily blocks the view by sensor portion 201 of the inanimate objects, the legacy data of the inanimate objects may be used to "fill in" and restore the temporarily-blocked depth or other related data.

This is useful, for example, to fill in "shadows" in the depth data caused by a human being standing between sensor 201 and an object such as a chair or table—in other words, since it is unlikely that the chair has moved on its own, system 200 can continue to draw or represent the chair using its legacy data of the field-of-view.

In Step 615, the 3D depth data are optionally rendered into a 2D view—for example, an overhead view, or a side view. FIG. 5 shows one example of how this rendering or transformation may be accomplished in some embodiments of system 200; in addition, many other methods of converting 3D data to 2D data are known in the art. In step 615, the 2D view may be further modified or made representational. For example, in step 615, elements of the 2D view may be blurred or otherwise obscured (for example, to enhance privacy). For example, in step 615, elements of the 2D view may be turned into indicia or graphics, such as cartoon-like representations.

In step 620, the elements of either the 3D or 2D data collection that correspond to the individual being monitored are marked. FIG. 5 shows an example of how each of these steps may be accomplished in some embodiments of system 200. As described in the previous paragraph, in steps 615 and 620, system 200 may use previously-collected information as legacy data (not shown in FIG. 6) of inanimate objects to fill in shapes or pixels in cases where the user is standing between sensor portion 201 and an inanimate object. Further, in step 620, elements corresponding to humans, animals, or inanimate objects may be turned into indicia or graphics. For example, in step 620, objects in the field-of-view corresponding to humans, animals, or furniture, may be represented as schematized or cartoon-like representations of (respectively) humans, animals, or furniture. An example of such representation is shown in FIG. 10.

Some embodiments of system 200 may further distinguish between humans, animals, and inanimate objects. For example, schematic output 232 may recognize, identify, label, or otherwise distinguish humans, animals, and inanimate objects from each other. There are many ways for system 200 to recognize whether an object in the field-of-view is a human, animal, or inanimate object.

For example, in some embodiments of system 200, if optional skeleton data 222 or optional pixel label data 226 are available, they may be used (singly or in combination) to identify those objects in the field-of-view that are humans. For example, the machine learning algorithms that generate optional skeleton data 222 or optional pixel label data 226 may recognize the presence of a moving sphere-shaped object (head) with two moving cylinder-shaped objects below it (arms), which combination distinguishes a human from either an animal or an inanimate object.

In some embodiments of system 200, if only depth data 220 (not optional skeleton data 222 or optional pixel label data 226 or optional color image data 224) is available, then many methods are still available to distinguish humans, animals, and inanimate objects from each other. For example, if a collection of depth measurements does not vary substantially (for example, beyond the threshold of statistical noise) over a period of days to weeks, then that collection of depth measurements likely corresponds to an inanimate object.

For example, if a collection of depth measurements moves over a short period of time (for example, within a few seconds or minutes), but the depth measurements are all of an object relatively low in height (for example, less than a half-meter above the floor), than that collection of depth measurements likely corresponds to a pet. Conversely, depth measurements of a relatively tall moving object (for example, more than a meter tall) are likely to correspond to a human. The methods described in this paragraph are examples that serve to illustrate the wide variety of methods that may be used to recognize and distinguish among humans, animals, and inanimate objects. In general, a wide variety of methods are described in the art, ranging from (for example) statistical to neural network to rules-based, that may be used by system 200 to recognize and distinguish among humans, animals, and inanimate objects.

In Step 625, the collection of 3D and/or 2D data are transmitted to an operator or other user, and/or transmitted to other devices, such as a storage system. Note that step 625 may transmit information to others users of similar systems 200. For example, in some embodiments of system 200, multiple users are able to "watch over" each other.

In Step 630, the collection of 3D and/or 2D data are optionally analyzed, either by human or automated algorithms, and text messages, alerts, warnings, and the like are optionally sent to mobile phones, computers, or other devices. For example, Step 630 might send an alert as a text message to a designated mobile phone, or as a security alert to authorized personnel.

Step 630 further allows a wide variety of other operations, calculations, or derivative measurements to be performed on measurements of the individual being monitored—for example, gait analysis, or clothing size measurement, as described in detail in related applications mentioned above. For example, step 630 may first calculate the centroid of 2D depth measurements corresponding to an individual within the field-of-view, and then further calculate the walking speed of the individual by comparing sequential such centroid calculations over time.

Step 640 evaluates the results of Steps 605-630 to decide whether all desired measurements have been obtained. Typically, it is preferable to continuously loop through the steps shown the flowchart of FIG. 6 as long as monitoring of the individual is active. Step 650 completes the flowchart.

Figure 7:
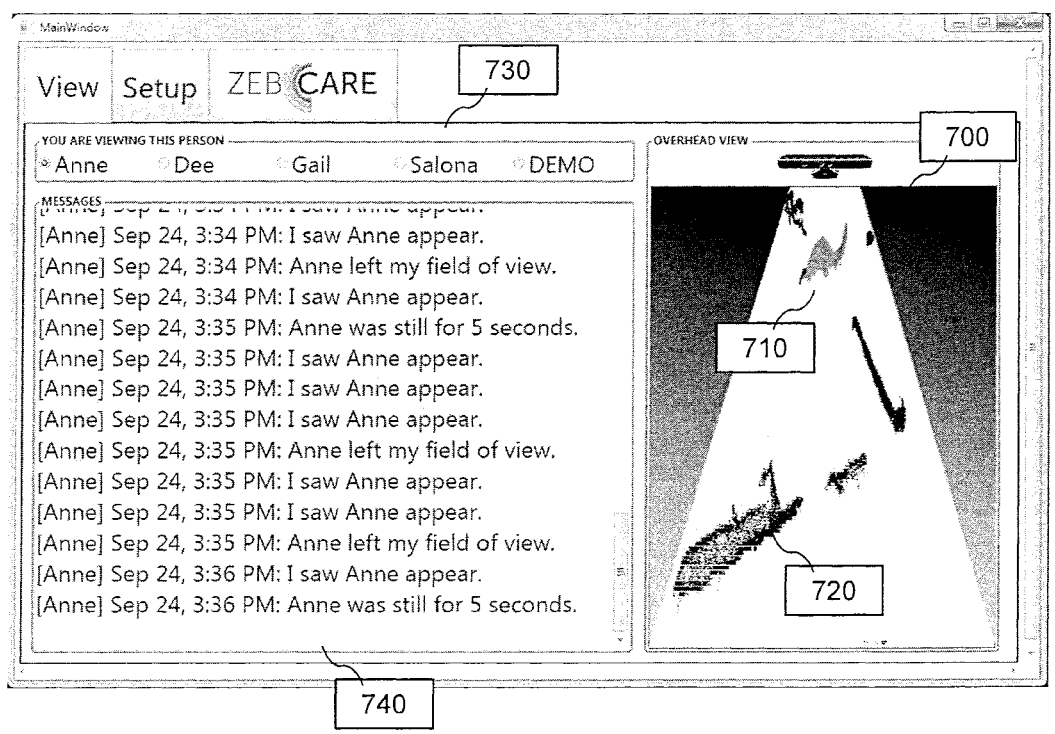
FIG. 7 shows a screenshot example of a real-world embodiment of the present system and method.

FIG. 7 shows a screenshot example of a real-world embodiment of the present inventive method. The 2D schematic 700 is similar to 2D depth representation 450 of FIG. 4B, or to the 2D schematic 550 of FIG. 5C. The 2D schematic 700 is the output of step 620 in FIG. 6, and corresponds to schematic output 232 of FIG. 2. In FIG. 7, a user 710 (which may be, for example, highlighted in green) is walking through the field-of-view of sensor portion 201. Around the user are various walls and furniture 720 (which may be, for example, highlighted in blue).

A list of the names of multiple users 730 appears in FIG. 7. In the example of FIG. 7, each of these users is in a different physical location—for example, the user's own home—and each user is supplied with a separate instance of system 200. These users are able to select each other's names, and by so doing, to switch the view of system 200 onto each other. This is an example of how system 200 enables these individuals to "watch over" each other, while preserving their privacy (because no photos or videos need to be acquired or transmitted). Being able to switch the 2D schematic 700 in order to view different users 730 is an example of step 625 of FIG. 6.

Alert listing 740 in FIG. 7 exhibits a series of alerts pertaining to one of the users, Anne. System 200 detects, at various times, that Anne has appeared in the field-of-view; that Anne has remained motionless for a period of time in the field-of-view; and that Anne has left the field of view. In FIG. 7, these alerts appear in alert listing 740, and are transmitted to others users as well (when a view is selected from the list of users 730). Alert listing 740 is an example of an output of Step 630 in FIG. 6. The alerts shown in FIG. 7 are examples, and not exhaustive of the alerts that may be generated by system 200.

Figure 8:
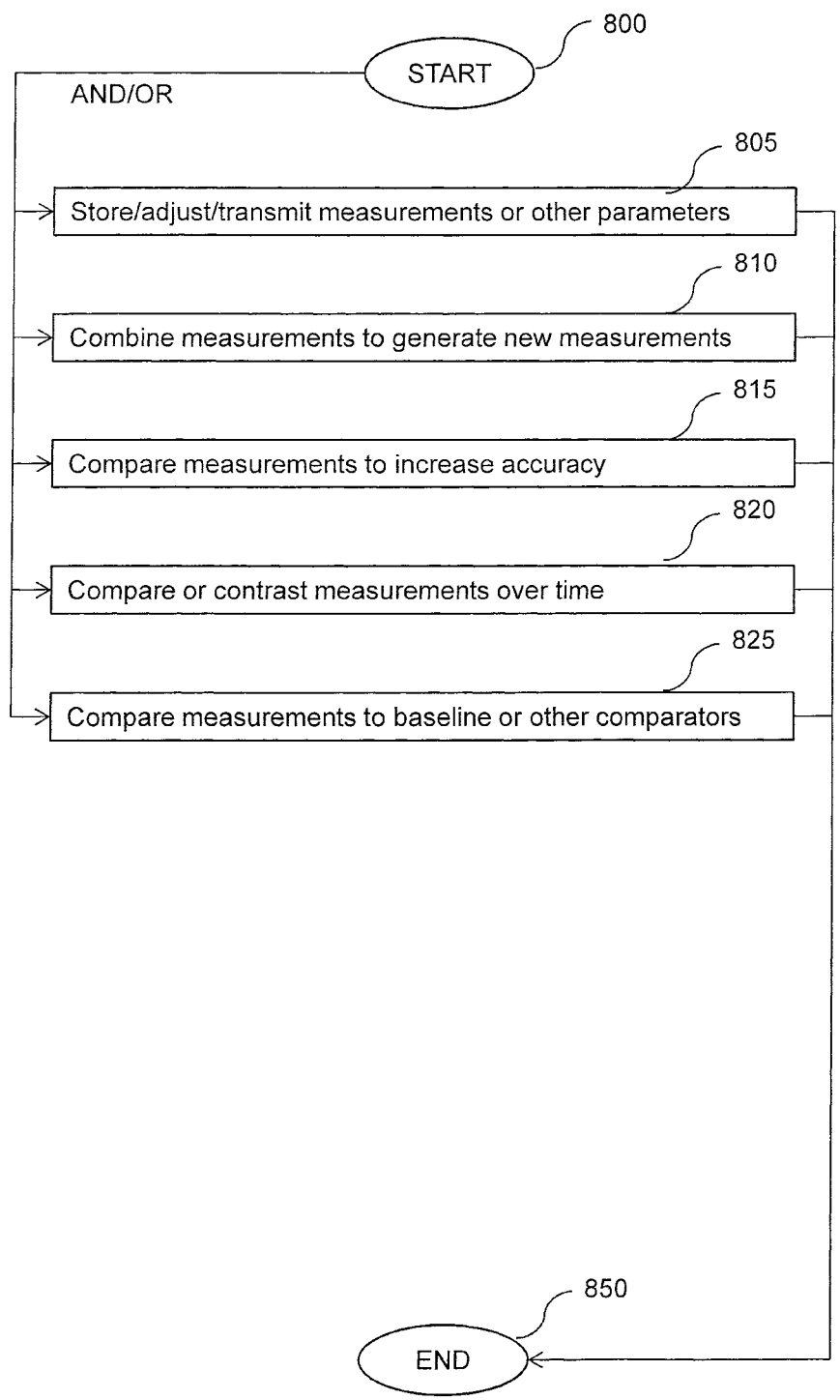
FIG. 8 shows several actions that may be undertaken once a collection of measurements (or schematic outputs) has been completed.

FIG. 8, which begins at Step 800, demonstrates the range of actions that may be performed once a collection of measurements, as described in FIG. 6 (Step 605), is complete. For example, FIG. 6, Step 630, may invoke the steps of FIG. 8 one or more times. The actions that may be taken once measurements are gathered, as shown in FIG. 8, include but are not limited to:

Step 805: store, adjust, or transmit the measurements, schematic outputs, or other parameters. For example, transmission of measurements or schematic outputs may occur via the internet, to a friend or a clinical facility that can monitor the user for signs of health status decline; or locally, to a disk storage, so as to retain and chart measurements over time. Measurements, schematic outputs, or other parameters may also be adjusted, for example, to match requirements for data structure or for data compression or for clinical use before being transmitted to another system or party. The term "parameter" herein refers to any aspect of the user, such as demographic data, or laboratory values from third-party devices (such as glucometers or blood pressure cuffs). (Note that in some embodiments, color image data 224, depth data 220, and optional skeleton data 222 are preferably not retained nor stored by the system 200, in order to preserve the privacy of the user.)

Step 810: combine the measurements to generate new measurements, e.g., the average walking speed of the user during a period of one day may be calculated by averaging several walking speed measurements taken at various times during that day.

Step 815: compare different measurements to improve the accuracy of the measuring process. For example, objects in the field-of-view whose measurements do not change over a period of several weeks may be assigned a high confidence that those measurements correspond to furniture.

Step 815 may also perform an additional calibration check on the system as a whole, by taking measurements of known objects using different data-snapshots, and then comparing the measurements to check for consistency.

Figure 9:
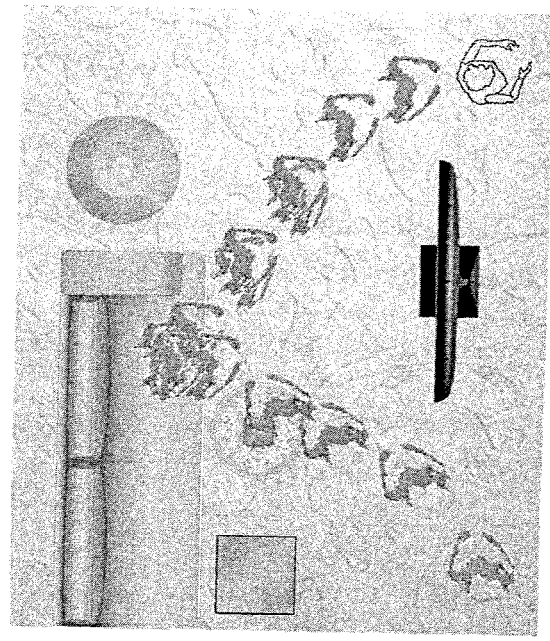
FIG. 9 shows an example of analytics, in this case a heat map, that may be performed by embodiments of the present system and method.

Step 820: compare or contrast measurements over time. This allows measurements to be charted or trended over time. For example, a "heat map" of the field-of-view may be generated, in which darker-colored areas highlight where the user has spent more time walking or sitting, and lighter-colored areas highlight where the user has rarely or never been present. FIG. 9 shows an example of a heat map.

Step 825: compare measurements or schematic outputs against user baselines or other types of benchmarks, or to other comparators (for example, measurements or schematic outputs generated for other users of system 200). Step 825 may perform comparisons using thresholds, statistical methods, or any other methods that enable a comparison of measurements, or any other data, over space or time.

The routine exits at Step 850.

The actions listed in FIG. 8 may be combined in any number, order, or sequence, and are further not intended to be exhaustive. The scope of the system and method includes any actions that may be performed upon the gathered measurements or schematic outputs.

FIG. 9 shows a "heat map" of an individual's location within a room, displaying widely-spaced representations of the individual where he/she spends less time, and closer-spaced representations where he/she spends more time. Such a heat map demonstrates, for example, that over time, an individual was spending increasingly more time sitting on a couch, and less time actively walking around. (Baseline and deviation measurements are not explicitly shown in FIG. 9.) The heat map of FIG. 9 may be generated, for example, by FIG. 8 Step 820.

Figure 10A:
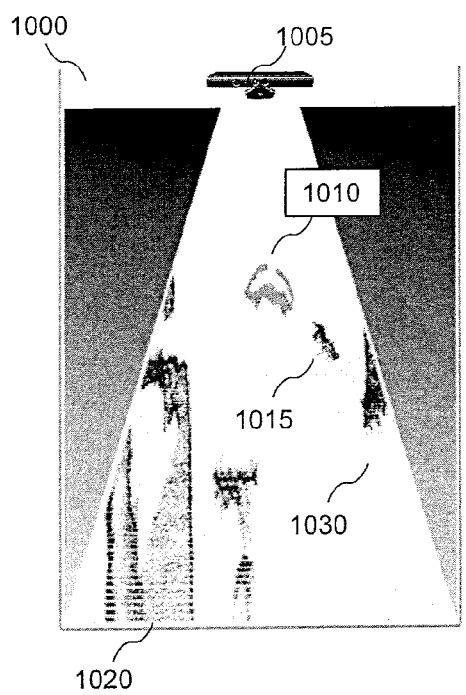
FIG. 10 shows an example of a cartoon-like or schematized representation of objects in the field-of-view.
Figure 10B:
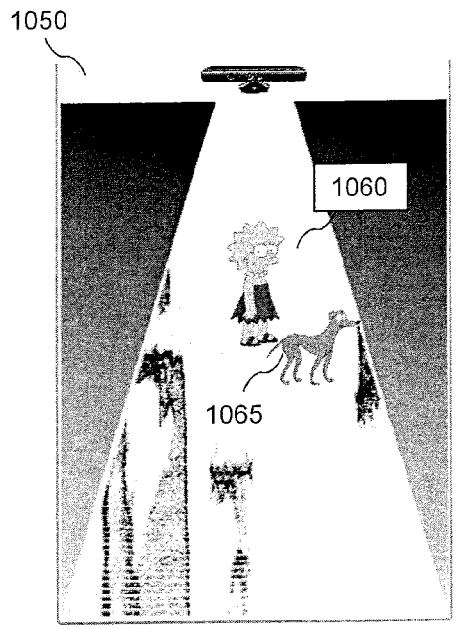

FIG. 10 shows an example of representing objects within the field-of-view as schematized or cartoon-like figures in schematic output 232. FIG. 10A shows a schematic output 1000, corresponding to the field-of-view of sensor portion 1005, within which are located a human 1010, a dog 1015, a couch 1020, and a TV 1030. FIG. 10B shows a corresponding schematic output 1050, in which the representation of the human 1010 has been converted to a cartoon-like FIG. 1060, and the representation of the dog 1015 has been converted to a cartoon-like FIG. 1065. The cartoon-like figures of FIG. 10B may be generated, for example, by FIG. 6 Step 615 or Step 620.

The cartoon-like figures of FIG. 10B (and, in general, any representational indicia or graphics utilized by system 200) may be varied by system 200, singly or over time. For example, in schematic output 1050, an icon of a seated stick figure might be used to represent an individual whenever that individual is sitting down, but a different icon of a standing stick figure might be used to represent the same individual whenever that individual is upright. For example, in schematic output 1050, an icon of an eating animal might be used to represent a dog whenever that dog is near the known location of its water bowl, and an icon of a non-eating animal might be used to represent the same dog otherwise.

Figure 11A:
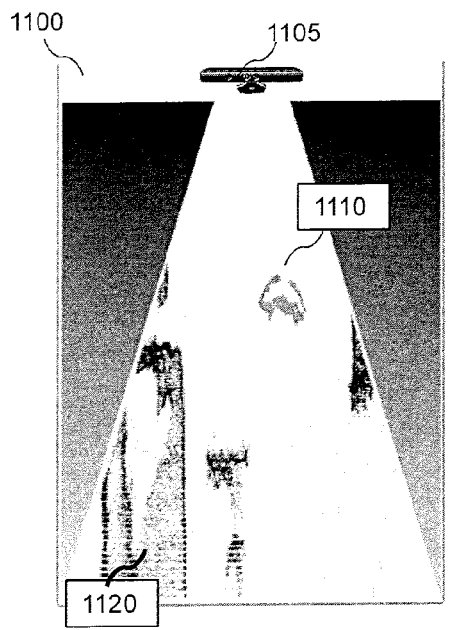
FIG. 11 shows an example of using legacy data when an inanimate object in the field-of-view is temporarily blocked or hidden by another object.
Figure 11B:
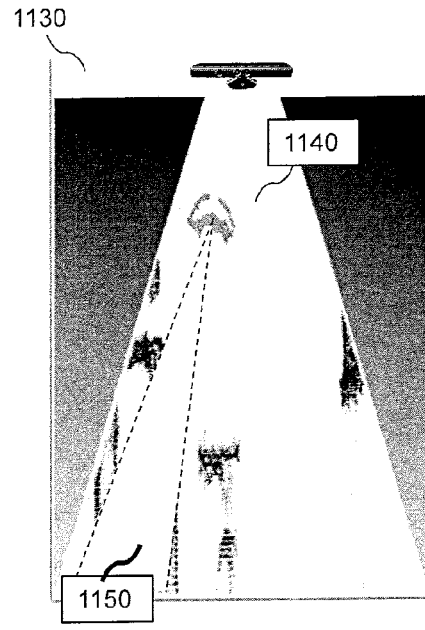
Figure 11C:
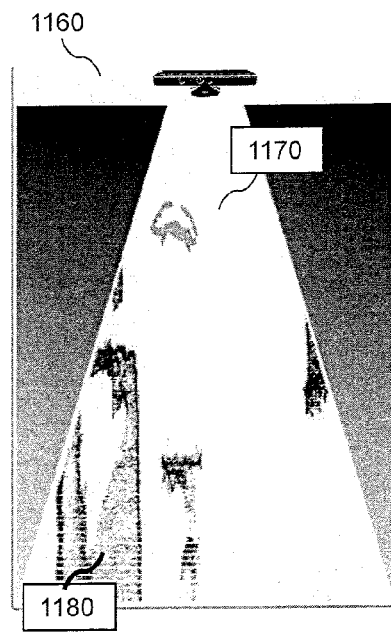

FIG. 11 shows an example of using legacy data to fill in missing information about objects in the field-of-view that are temporarily hidden from view of sensor portion 201. FIG. 11A shows a schematic output 1100, corresponding to the field-of-view of sensor portion 1105, within which are located a human 1110 and a couch 1120. In the example of FIG. 11A, system 200 recognizes that couch 1120 is an inanimate object (for example, because the couch remains stationary for days or weeks), and so system 200 retains depth measurements of couch 1120 as legacy data. FIG. 11B shows a schematic output 1130 in which legacy data is not used. In FIG. 11B, the human 1130 has changed location within the room, and is now temporarily blocking the sensor's view of couch 1120. As a result, some of the depth measurements of couch 1120 can no longer be obtained by sensor portion 1105, and so, without the use of legacy data, the couch appears in schematic output 1130 as having a "hole" or a "shadow" 1150 that is caused by the presence of human 1140. FIG. 11C shows a schematic output 1160 in which legacy data is used. In FIG. 11C, the system 200 "fills in" the missing information for couch 1180 using legacy data, so that couch 1180 appears substantially similar to couch 1120, even though sensor portion 1105 remains temporarily blocked from view by human 1170. Although this example shows an example of legacy data for a single couch, it is apparent that storage and use of legacy data may be applied to any or all objects in a field-of-view, or to portions of those objects; may correspond to one or to multiple time periods; and may be utilized over any desired duration (or durations) of time.

As mentioned earlier, embodiments of the present inventive method may be used in a wide variety of applications. For example, in monitoring individuals while protecting their privacy, embodiments of the present inventive method may be employed to measure entrance into a field-of-view; exit from a field-of-view; duration of time spent moving, or spent motionless, within a field-of-view; duration of time spent sitting, or standing, within a field-of-view; noting whether a user reaches for, or points to, an object; and many other types of measurements. The schematics generated by system 200 may be used in a wide variety of settings, including healthcare, security, and retail stores. These are illustrative examples and do not restrict the scope of the present inventive method.

Returning to FIGS. 2A-2F, the system 200 may be embodied as a system cooperating with computer hardware components and/or as computer-implemented methods. The system 200 may include a plurality of software modules or subsystems. The modules or subsystems, such as the sensor portion 201 and the computer subsystem 298, may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

The system 270 of FIG. 2F is a high-level hardware block diagram of one embodiment of the system 200 used to monitor individuals while protecting their privacy. The system 200 may be embodied as a system cooperating with computer hardware components and/or as computer-implemented methods. For example, the subsystems, such as the depth calculation module 210 and all other modules herein, may each include a plurality of software modules or subsystems. The modules or subsystems may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

Additionally, the hardware system 200 shown in FIGS. 2A-2F, including the various cameras and sensors, in one specific embodiment may be provided by one or more commercially-available hardware platforms. For example, sensor portion 201 may be provided by the Kinect System, available from Microsoft Corporation, or by the Xtion device, available from Asus Corporation. Such commercially available devices may be used to generate depth data and/or color image data and/or skeleton data and/or pixel label data. For example, computer subsystem 298 may be provided by the Xbox System, available from Microsoft Corporation, or by a personal computer, such as one running Microsoft Windows or Apple OS X.

Furthermore, FIG. 2F displays a high-level hardware block diagram of a system computer 298 that may be used to execute software or logic to implement the measurements of the user and other steps disclosed in this document. The computer or computer subsystem 298 may be a personal computer and may include or connect to various hardware components, such as the RAM 296, the ROM 297, the data storage 284, and the like. The computer 298 may include any suitable processor or processing device 295, such as a subsystem computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art.

For example, the processing device 295 may be an Intel Pentium® microprocessor, x86 compatible microprocessor, single core processor, dual-core processor, multi-core processor, or equivalent device, and may be incorporated into a server, a personal computer, server, remote computer, cloud processing platform, or any suitable computing platform.

The RAM 296 and ROM 297 may be incorporated into a memory subsystem, which may further include suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user input 287 may be coupled to the computer 298 and may include various input devices, such as switches selectable by the system manager and/or a keyboard, or may be conducted independently of such devices, e.g., by using hand gestures or other body gestures, or by using voice commands. The user interface also may include suitable display devices 285, such as an LCD display, a CRT, various LED indicators, a printer, and/or a speech output device, as is known in the art.

To facilitate communication between the computer 298 and external sources, a communication interface 286 may be operatively coupled to the computer system. The communication interface 286 may be, for example, a local area network, such as an Ethernet network, intranet, Internet, or other suitable network. The communication interface 286 may also be connected to a public switched telephone network (PSTN) or POTS (plain old telephone system), which may facilitate communication via the Internet. Any suitable commercially-available communication device or network may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

Returning to FIG. 8, Step 805 enables the user of the system to store, adjust, and/or transmit measurements or other parameters. These stored, adjusted, and/or transmitted items may be determined by the most recent set of measurements conducted by the system 200; or by any previous set of measurements, conducted by the system 200 in the past, and then stored for later use; or by any set of measurements provided exogenously (e.g., through ancillary devices or user input); or by any combination of subsets thereof, including any combination of individual measurements drawn across different collections of measurements, including measurements acquired by the system 200 or supplied by the user or by other sources.

The system 200 may interface with, or interact with, an online portal through which people may view historic and current measurements and/or schematic outputs, and analytics on those measurements and/or schematic outputs (for example, graphs or calculations). The portal may be a web browser portal, or a portal that is made available through a software download to a videogame system, or a portal that is made available through an application download to a tablet computer or a mobile phone, or any other type of online interface.

Examples of commercially-available web browsers include Microsoft Internet Explorer, Mozilla Firefox, Apple Safari, and Google Chrome. Examples of commercially-available videogame systems include Microsoft Xbox, Sony PlayStation 3, and Nintendo Wii. Examples of tablet computers include Apple iPad and Samsung Galaxy Tab. Examples of mobile phone operating systems include Microsoft Windows Phone, Apple iPhone iOS, and Google Android. Embodiments of the present system and method may incorporate, link to, network with, transmit information to or from, or otherwise employ or utilize any kind of online portal, whether part of the system 200 or supplied by a third party, without limitation.

In Step 805, the system 200 may transmit measurements or schematic outputs or other parameters, for example, to subsystems of system 200 (such as data storage device 284), or to external systems or recipients (such as a clinical facility or online database). The measurements or schematic outputs or other parameters may be adjusted in terms of format, units (e.g. metric vs. imperial), or in any way desired. The measurements or schematic outputs or other parameters may be transmitted to, from, or via an online portal, or to, from, or via any other system or third party. A recipient of measurements or schematic outputs or other parameters may be, for example, a clinician, who evaluates whether a health status decline is likely occurring, and who may choose to intervene, for example, by calling or visiting the patient.

A recipient of measurements or schematic outputs or other parameters may also be a caregiver, such as a relative or home aide or friend. A recipient of measurements or schematic outputs or other parameters may also be a social networking system, such as a website or mobile application, which may be part of the system 200 or may be provided by or via any other system or third party, and which may utilize the measurements or schematic outputs or other parameters to share the user's health status with other individuals in the user's social network.

Returning back to FIG. 3A, system 300 incorporates aspects of the system 200, but augmented with audio sensor 308 and output audio data 309. For example, audio sensor 308 may be a microphone or an array of microphones. System 300 is therefore capable of conducting measurements of the user's voice and speech, in addition to measurements of the user's body. For example, system 300 may conduct measurements of the volume and cadence of the user's speech over time. For example, reduced volume compared to baseline, or slurred speech compared to population comparators, may indicate a decline in health status. Measurements of the user's voice may also be undertaken to evaluate emotional status—for example, louder volume than usual, or frequency spectra consistent with angry or depressed tones of voice. References to "measurements" contained herein therefore may therefore refer not just to spatial measurements of a user's body, but also audio measurements of the user's voice and speech.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of monitoring the presence and movement of an individual while protecting the individual's privacy, the method comprising:
    capturing data corresponding to objects positioned within a field-of-view of at least one energy sensor, such that identifying the individual cannot be ascertained from the captured data, wherein the at least one energy sensor is configured to capture energy reflected from the individual and the objects within the field-of-view;
    generating depth data for the field-of-view based on the captured data from the at least one energy sensor;
    identifying elements of the depth data that correspond to the individual within the field-of-view;
    identifying elements of the depth data that correspond to an inanimate object within the field-of-view;
    calculating one or more spatial measurements based on the elements that correspond to the individual and the elements that correspond to the inanimate object, wherein each of the one or more spatial measurements corresponds to a physical dimension; and
    generating a schematic output representative of the field-of-view, based on at least one or more spatial measurements, wherein at least the individual and the at least one inanimate object are labeled in the schematic output.

2. The method of claim 1, wherein the depth data and/or the one or more spatial measurements are used to generate a schematic output.

3. The method of claim 2, wherein the schematic output is at least one member selected from the group consisting of: an overhead view, a side view, a trajectory, a heat map, and a cartoon.

4. The method of claim 1, wherein the depth data are analyzed for changes in presence or motion, and update-messages or warning-messages are supplied to users, operators, or caregivers.

5. The method of claim 1, wherein a plurality of individuals are simultaneously monitored.

6. The method of claim 5, wherein individuals are identified or distinguished from each other by facial recognition or by body biometrics.

7. The method of claim 1, wherein skeleton data and/or pixel label data are generated from the depth data.

8. The method of claim 7, wherein the skeleton data and/or pixel label data are used to identify the elements of the depth data that correspond to the at least one individual.

9. The method according to claim 1, wherein the at least one energy sensor acquires at least one of reflected infrared light, reflected laser light, reflected ultraviolet light, reflected visible light, reflected X-rays, reflected microwaves, reflected radio waves, reflected sound waves, reflected ultrasound energy, and reflected thermal energy.

10. The method according to claim 1, wherein the depth data are generated through LIDAR methods.

11. The method according to claim 1, wherein the depth data are generated through pattern deformation methods.

12. The method according to claim 1, wherein at least one additional energy sensor is positioned nearby such that the field-of-view of the at least one additional energy sensor at least partially coincides with the field-of-view of the at least one energy sensor, and wherein the at least one energy sensor acquires a first spectrum of energy that overlaps with a second spectrum of energy acquired by the at least one additional energy sensor.

13. The method according to claim 12, wherein the at least one additional energy sensor acquires visual light.

14. The method according to claim 12, wherein the at least one energy sensor and the at least one additional energy sensor are co-located in space.

15. The method of claim 1, wherein a rate of change over time of depth data corresponding to an object within the field-of-view is used to identify whether the object within the field-of-view corresponds to the at least one individual or the at least one inanimate object.

16. The method of claim 1, wherein morphology of depth data corresponding to an object within the field-of-view is used to identify whether the object within the field-of-view corresponds to the at least one individual or the at least one inanimate object.

17. A method of monitoring the presence and movement of an individual while protecting the individual's privacy, comprising:
   capturing data corresponding to objects positioned within a field-of view of at least one energy sensor, such that identifying characteristics of the individual cannot be ascertained from the captured data, wherein the at least one energy sensor is configured to capture energy reflected from the objects within the field of-view;
   generating depth data for the field-of-view based on the captured data from the at least one energy sensor;
   identifying elements of the depth data that correspond to the individual within the field-of-view;
   identifying elements of the depth data that correspond to an inanimate object within the field-of-view;
   calculating one or more spatial measurements based on the elements that correspond to the individual and the elements that correspond to the inanimate object, wherein each of the one or more spatial measurements corresponds to a physical dimension; and
   generating a schematic output representative of the field-of-view, based on at least the one or more spatial measurements, wherein at least the individual and the at least one inanimate object are labeled in the schematic output.

18. The method of claim 17, wherein the schematic output of the field-of-view is supplied to an operator, a display device, or a storage device.

19. The method of claim 17, wherein at least the depth data or the spatial measurement corresponding to the at least one inanimate object is retained over time as legacy data.

20. The method of claim 19, wherein the retained legacy data is used to augment or fill-in the schematic output when an individual in the field-of-view obstructs a view of the at least one inanimate object.

21. The method of claim 17, wherein the depth data or the one or more spatial measurements are transformed into at least one of a two-dimensional schematic, a two-dimensional cartoon, a two-dimensional avatar, a three-dimensional cartoon, a three-dimensional avatar, a two-dimensional stick figure, and a three-dimensional stick figure.

* * * * *